Aug. 10, 1965  D. L. JOSLOW  3,199,226

TEACHING MACHINE

Filed Sept. 29, 1961  5 Sheets-Sheet 5

3,199,226
TEACHING MACHINE
David L. Joslow, Chester, Conn., assignor to Chester Electronic Laboratories Incorporated, Chester, Conn., a corporation of Connecticut
Filed Sept. 29, 1961, Ser. No. 141,856
18 Claims. (Cl. 35—35)

This invention relates to a teaching machine for supplying a student with audible instructional material, and deals more particularly with a teaching machine adapted for laboratory use whereby a large number of students may individually select and listen to any one of many available instructional programs.

The teaching machine with which this invention is concerned may be used in various different ways and as a facility for teaching a wide variety of subjects. At the present time, however, it has been applied mainly to the teaching of languages and therefore for the purpose of explanation this use has been assumed herein by way of example.

In regard to the teaching of languages, it is now commonly felt that the traditional method of teaching by way of groups or classes led by an instructor does not, by itself, promote the maximum development of all students. In such classes when conversation is being taught any one student plays a relatively passive part and spends most of his time listening to the conversation of the instructor and other students. This conversation, however, may not necessarily be suited to his ability, being either too easy or too difficult for him, and the conversation of his fellow students is seldom something to be used as a model. As a result the student's time is not well used.

To overcome this disadvantage of the traditional classroom teaching method, particularly in regard to teaching conversation, various types of teaching machines have been proposed recently for allowing each member of a group or class to participate more actively in the language instruction. In the simplest type of teaching machine (audio-passive) the student listens only, through a pair of headphones, to a prerecorded master program. The chief advantage of this machine is that the program may be prepared with quite some care and is therefore usually of more value to the student than the normal conversation of an instructor speaking extemporaneously to a class. Also, the student may replay the program and listen to it for as many times as he desires.

In another more complex type of teaching machine (audio-active) the student both listens and responds to prerecorded programs. He is provided with a pair of headphones and a microphone and listens to a master recording. As the recorded program comes to him he is given opportunity, by pauses in the program, to respond to or repeat in his own voice the material he has just heard. His own voice is fed beck instantaneously to him through his microphone and headphones, and the headphones isolate him from the voices of other students. Further isolation may be obtained by having a desk or booth for each student with partitions between each such desk or booth.

In a still more complex type of teaching machine (audio-active-comparative) the student listens through a pair of headphones to a master recording, responds through a microphone, and at the same time records both the master program and his own voice. He then plays back his recording to compare the master voice with his own. He can then also use his recording of the master program as a source of instructional material, playing it back, responding to it, and comparing his responses to it for as often as he needs to learn a particular phrase or the like.

In the case of any of these three types of teaching machines there is some problem in regard to the handling of the master recording. At present they are generally handled in one of two ways. In the first method the master recording is played at some remote location, such as at a teacher's console, and transmitted simultaneously to all of the students. Possibly several master recordings are played at once and transmitted to a teacher's console with the console having provision for connecting each student to a selected program, but in any event the choice of programs available to the student is limited and full freedom of program selection by the student is not provided. In the second method the student selects master recordings from a recording library and plays them on a playback recorder at his own study location. He can therefore work entirely independently of other students and at his own level and rate, the master recordings being chosen to suit his particular requirements. This method, however, has the obvious disadvantage of requiring the maintenance of a stock of duplicate master recordings so that several students may play the same program if desired, and the further disadvantage of requiring the student to handle the master recordings, to place the recordings onto and take the same off the play back machines, and to otherwise handle the recording equipment.

The general object of this invention is to provide a teaching machine for supplying a student with audible instructional material from prerecorded master recordings or other sources and wherein the student is capable of selecting and listening to any one of many master programs, without having to handle recordings and without the intervention of a teacher or other supervisor, by manipulating simple controls at his study location. In regard to the manner in which the master recordings or programs are selected by the student, the selection mechanism contemplated by this object is such that it may be used with any of the three types of machines referred to above to provide the student with full freedom of program selection.

A further object of this invention is to provide a teaching machine of the foregoing character which in addition to being simple for the student to operate, is dependable in operation, is flexible in use so as to be readily adapted for various different types or modes of operation, and is faithful in its reproduction of the human voice.

A still further object of this invention is to provide a teaching machine or system wherein a single program center may supply an unlimited selection of programs to individual students in classes or laboratories in the same or other buildings remote from that of the program center. In keeping with this object, for example, the teaching machine is such that a single program center may be used to supply all the schools of a town with instructional material with students in each school being able to individually select and listen to any one of the programs supplied from the center.

Another object of this invention is to provide in a teaching machine comprising a number of students booths or study areas and a source of various different programs, means including a telephone type dial at each study area whereby the student at the study area may select and be connected to any program from the source, and may also control the operation of other parts of his equipment, by manipulating his dial.

A further object of this invention is to provide in a teaching machine of the character set forth in the preceding paragraph a novel means including a crossbar switch for selecting programs in response to the dial pulses received from the student booths.

A further object of this invention is to provide for use in a dial operated teaching machine of the foregoing character a novel logic apparatus for receiving dial pulses from a dial at a student booth and for controlling the routing of the dial pulses and the operation of other pieces of equipment in response to the information contained in the dial pulses so that the dial may be used to control the function of a student recorder and to make program selections from the program source.

Other objects and advantages of the invention will be apparent from the following description and from the drawings forming a part thereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

GENERAL ORGANIZATION—FIG. 1

Figure 1:
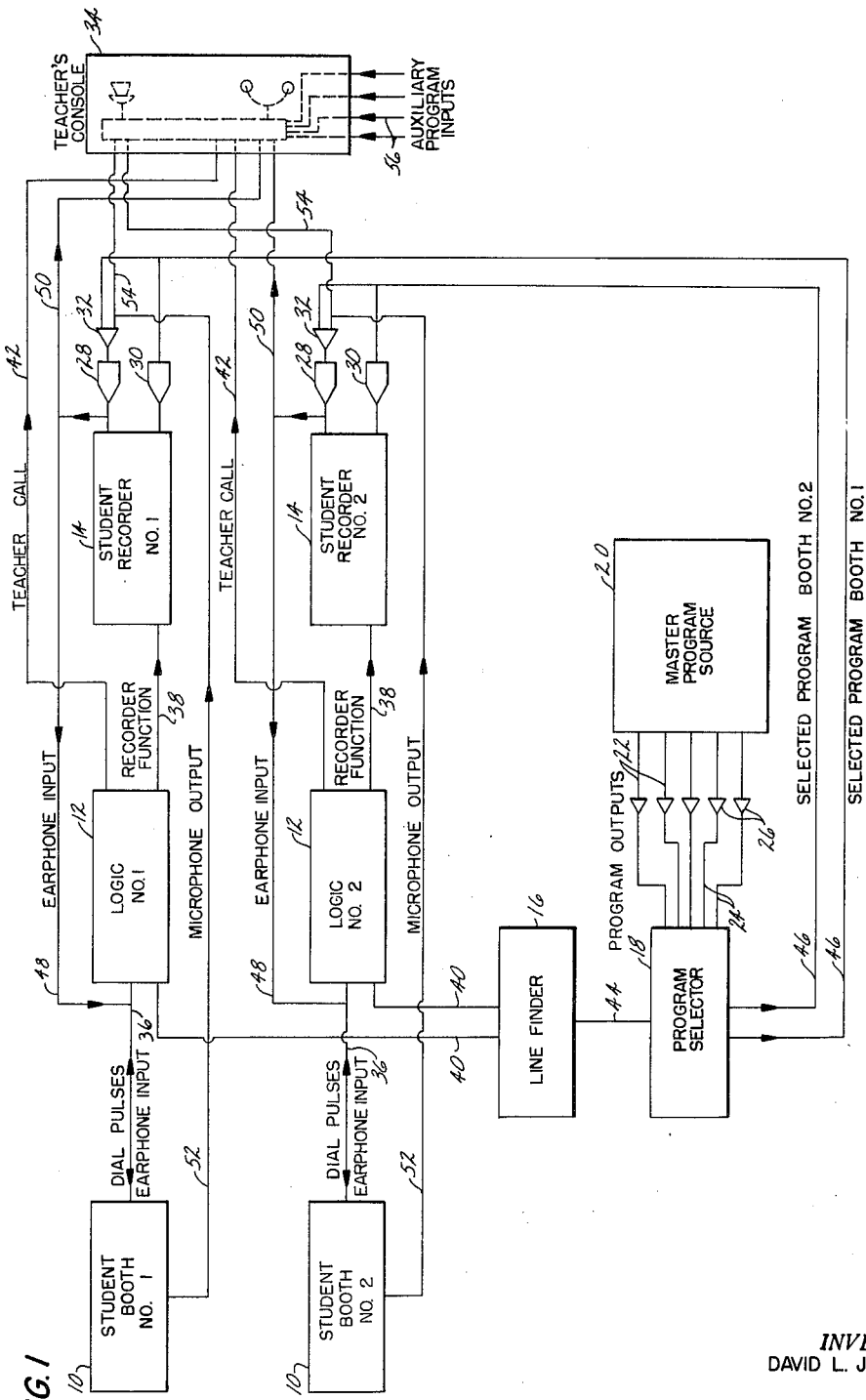
FIG. 1 is a block diagram illustrating the arrangement of the basic components of a teaching machine embodying the present invention.

A teaching machine comprising a typical embodiment of the present invention is illustrated in the block diagram of FIG. 1. This machine includes a number of student study areas 10, 10, a corresponding number of logic units 12, 12 and a corresponding number of student recorders 14, 14. The study areas may be of any convenient design and preferably consist of booths with partitions whereby each student is at least partially, if not completely, isolated from the voices of his fellow students. By way of example, FIG. 1 shows two student booths 10, 10 associated with two logic units 12, 12 and two student recorders 14, 14, but it is to be understood that the machine is adapted for use with a virtually unlimited number of student booths such as that shown in FIG. 1 and that other booths may be added to the machine in accordance with the same scheme as shown in FIG. 1.

As hereinafter described, each booth includes a sound reproducer, preferably a pair of earphones, and a microphone. It also includes a volume control dial for adjusting the loudness of the output from the sound reproducer. Where earphones are used as the sound reproducer they are preferably combined with the microphone into an integrated headset.

Associated with the two logic units 12, 12 is a single line-finder 16 and a single program selector 18. The line-finder 16 and program selector 18 are capable of handling a given number of student booths and therefore when the machine is used with a very large number of booths it is to be understood that it will include additional line-finders and selectors. In the illustrated case for example the line-finder and program selector are designed to handle ten student booths and accordingly any machine using such a line-finder and program selector will include one such line-finder and one such program selector for every ten booths. The number of booths handled by each line-finder and program selector is, however, not critical and other line-finders and program selectors capable of handling a different number of booths may be used without departing from the invention.

Associated with the program selector 18 is a source 20 of master programs which source supplies a plurality of continuously available master program outputs to the program selector 18. The program outputs supplied by the source 20 may be derived from various different devices such as radio receivers and film sound tracks. Preferably, however, the source consists of a plurality of continuously playing and automatically rewinding tape playback machines each of which is supplied with a master tape having recorded thereon a master program, different master programs being recorded on different master tapes. These master tapes may be and are preferably supplied as part of tape cartridges which are readily placed onto and taken off the playback machines, and each tape may include several, for example four, tracks of recorded master programs so that several master program outputs are obtained from each playback machine. These playback machines convert the prerecorded master programs into electrical signals which appear at the output terminals 22, 22 of the source 20, and these terminals are in turn connected to the program selector 18 by the lines 24, 24. Suitable preamplifiers 26, 26 are employed between the output terminals 22, 22 of the porgram source 20 and the program selector 18 to provide the program selector 18 with amplified master program output signals. Accompanying each student recorder 14 are two power amplifiers 28 and 30 and a preamplifier 32. The operation of the entire machine may be supervised from a teacher's console 34 which is tied to each of the student booths by suitable lines.

As hereinafter described each student booth 10 contains a device operable by the student using the booth for generating trains of short pulses. Preferably, this device consists of a telephone type dial apparatus and accordingly will be referred to hereinafter as a dial means, and the short pulses referred to as dial pulses, but in using these terms there is no intention to limit the invention specifically to telephone type dials and where convenient any other similar device for producing trains of short pulses may be used. The dial pulses generated in a student booth are transmitted by a dial or communication line 36 to the associated logic unit 12. The latter unit being operable in response to the received dial pulses to convert the same either into tape deck function commands transmitted to the associated student recorder 14 by the line 38 or for routing the dial pulses to the associated line-finder 16 through the line 40. The student recorder 14 is both a recording and playback mechanism. Preferably it consists of a two track tape recorder and the function commands transmitted thereto by the line 38 are such as to cause it to play, record, rewind, stop or to perform other such functions.

The construction of each logic unit 12 is such as to be responsive to the dial of one particular digit, herein referred to as the "select program" or call digit, to transmit a call signal to the line-finder 16. As long as the call digit is not dialed the logic unit will function in such a manner as to select a tape deck function in response to the receipt of a first train of dial pulses and to restore itself to a normal condition and stop the recorder upon the receipt of the next train of dial pulses. For example, in the illustrated case the dialing is set up on the following basis.

Dialed digit:                      Response
1 _____ Top track playback and bottom track record.
2 _____ Two track playback.
6 _____ Select program and two track record.

8 _____ Fast forward tape transport.
9 _____ Rewind tape.
0 _____ Console call.

Here the digit 6 is the select program or call number, the digits 1, 2, 8 and 9 are "mode numbers" corresponding to various operational modes of the recorder, and 0 is a teacher or console call digit. Under this dialing scheme if numbers 1, 2, 8 or 9 are dialed the logic unit will serve to transmit a command or signal by means of the line 38 to the associated student recorder to cause the recorder to function in the mode assigned to the dialed digit. The next received dial pulse will restore the logic and upon restoration the logic will transmit a stop signal to the student recorder. If the digit 0 is dialed, a signal is transmitted by the associated line 42 to the teacher's console to light a light or actuate some other signal to indicate to the teacher a call from the associated student's booth.

When the call digit 6 is dialed, a call signal is transmitted to the line-finder 16 to start the same in operation and to thereafter cause the same to lock on the associated calling line 40. When the line-finder does lock on the calling line a dial tone is transmitted to the student's earphones or other sound reproducer in the booth to indicate the readiness of the circuit to accept further dial pulses for effecting a program selection. At the same time as the call digit 6 is dialed, the logic is so conditioned that subsequent dial pulses received thereby will not cause its restoration until a complete program selection has been made. Further, the dial of the call digit 6 causes the student's recorder to be set on two track record and otherwise conditioned so that the recorder will record on one track the selected program and on the other track the student's responses.

When the line-finder locks on a calling logic, as a result of dialing the digit 6, subsequent program selecting dial pulses are transmitted by the calling line 40 to the line-finder and through the line-finder to the program selector 18 by the line 44. These selecting dial pulses received by the program selector 18 operate the latter to cause one of the master program outputs supplied by the lines 24, 24 to be connected with an output or selected program line 46 connected to the program selector and associated with the calling student booth or logic. The particular program selected by the program selector 18, it will be understood, is dependent on the number of dial pulses in the pulse trains transmitted thereto. Each master program output has assigned to it a different program number and upon dialing a program number, after the dial of 6 and the receipt of a dial tone, the pulse trains transmitted to the program selector will cause the program output corresponding to the dialed program number to be connected to the line 46. Therefore, the student by operating his dial may be connected with any one of the program outputs from the program source 20.

The selected program output which is delivered to the line 46 is transmitted by the latter line to the associated power amplifier 30 and the output thereof is transmitted to the associated student recorder 14 where it is recorded on one of the tracks of the tape. The program output is also transmitted to the associated preamplifier 32 where it is mixed with the microphone output from the associated student booth supplied by the line 52. The output from the preamplifier 32 is in turn transmitted to the associated power amplifier 28 and the output of the latter is transmitted by the lines 48 and 36 to the earphones of the student booth so that the student will hear both the selected program output and his own vocal responses. The output from the power amplifier 28 is also transmitted to the associated recorder 14 where it is recorded on the other track of the tape. It will be noted that in this arrangement the line 36 serves the double purpose of transmitting dial pulses to the logic unit when the dial is operated and of transmitting the output of the amplifier 28 to the earphones. This is accomplished by suitable switches in the dial device which connects the device to the line 36 only when the dial is moved from its normal position and by a condenser which prevents the resistance associated with the earphones from shunting the line 36. Also, another line, not shown in FIG. 1, connects the playback output from the recorder to the preamplifier 32 so that this output is amplified and transmitted to the student's earphones.

Other lines 50, 50 also connect the output from each power amplifier 28 to the teacher's console 34 so that the teacher may listen in on any one of the students, the teacher's console including suitable switches for connecting the earphones at the console to any one of the incoming lines 50, 50. The teacher's console also includes a microphone which is selectively connectible by means of a suitable switch in the console to any one of a number of lines 54, 54 each leading to a respective one of the preamplifiers 32 so that the teacher may speak to any one of the students from the console. The teacher's console may also include a tape recorder or other device (not shown) selectively connectible with any one of the lines 50, 50 for recording the work of individual students.

In addition to the master program outputs provided by the program source the teacher's console 34 may also include provision for auxiliary program inputs as indicated by the lines 56, 56. These auxiliary inputs may be derived from various different sources and typically are the outputs from one or more tape recorders located in or near the teacher's console. By suitable switching in the console the teacher may connect any one of the student booths through the lines 54, 54 to any one of the auxiliary program inputs 56, 56. This feature thus allows the teacher to supply his group of students with special programs which may not be readily available at the program source 20, or to supply special programs for use in the course of an examination or test.

From the foregoing it will be understood that all of the components other than the earphones, microphone and dial provided at each study area or booth may be located at a remote location from the study area. A typical installation, for example, comprises a plurality of student booths located in one room or laboratory with a teacher's console being located at the head of or to one side of the room. The associated logic units, student recorders, line-finders, program selectors, and program machine are in turn located in another room or closet separate from the laboratory. In this equipment room or closet the components may be arranged in suitable racks or cabinets for ease in access and maintenance and the area may be made dustproof as a safeguard against possible malperformance due to dirty relay contacts or the like. Any one such equipment room may serve any number of laboratories in a single school. Additionally, it is to be further understood that any single program source, such as that shown at 20, may be used as a program source for a widely scattered number of schools. In this case, the program source 20 may be located at one point in a town and connected to each of a number of schools by lines 24, 24 which lines could be existing telephone transmission lines. In this case each school would further have its own equipment room containing the logic units, student recorders, line-finders, and program selectors, and any number of laboratories containing student booths or study areas connected by suitable lines to the components located in the equipment room. If desirable it is also possible, in the case of a central program source serving several schools or the like, to have all of the logic units, student recorders, line-finders, and program selectors located at the central area with the program source. In other words, all equipment for servicing several schools may be located at the central area except for the dials, headset and volume controls at each student booth. Any one of these arrangements results in very neat appearing laboratories uncluttered by complex pieces of equipment, each student booth containing only earphones, a volume control, a microphone and a dial by means of which dial the student may achieve complete control over the selection and use of the instructional material available from the program source.

DIAL AND LOGIC ASSEMBLY—FIG. 2

Figure 2:
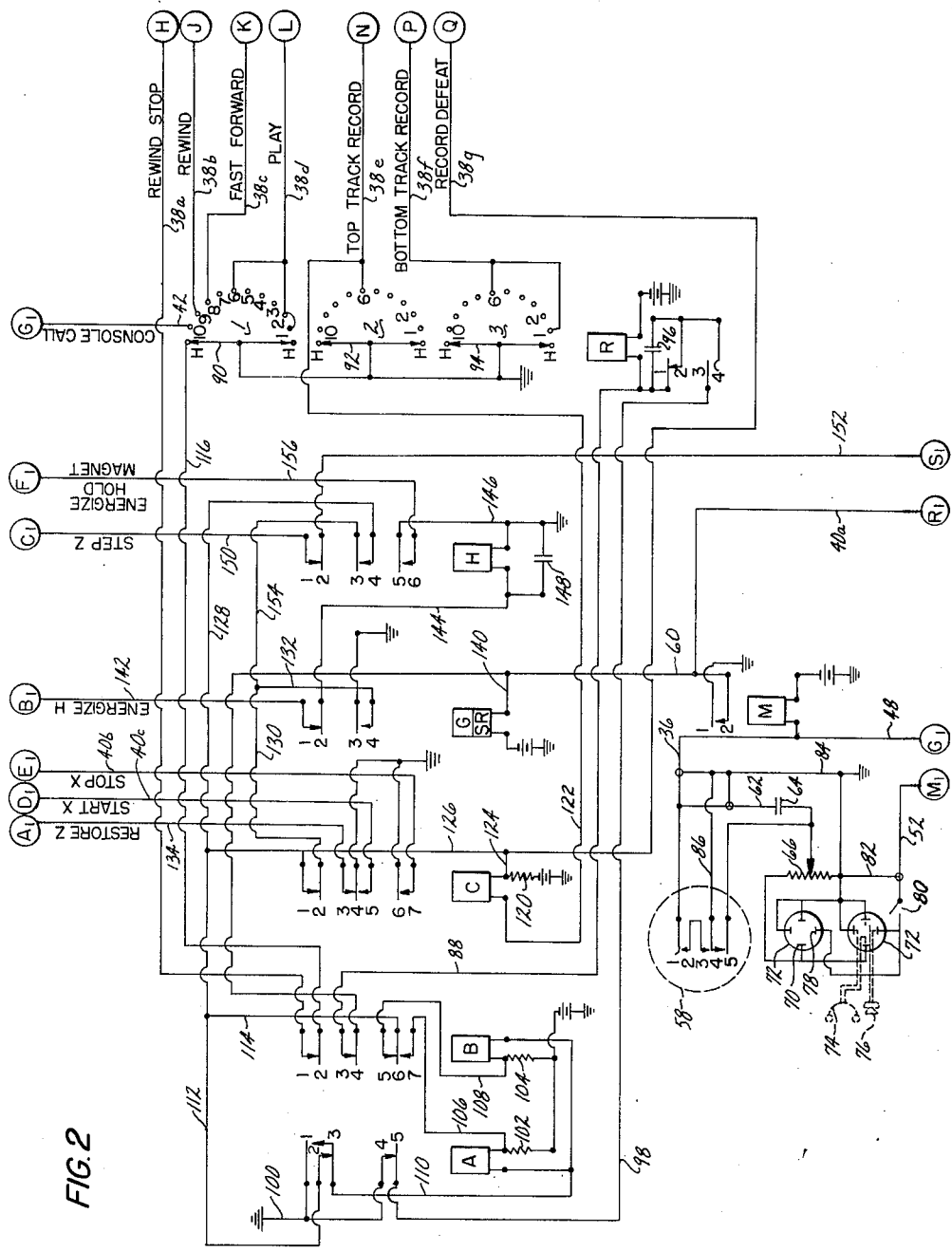
FIG. 2 is a wiring diagram of the dial means and logic assembly associated with one of the student booths of the teaching machine of FIG. 1.

Reference is now made to FIG. 2 wherein is shown the dial device and logic unit associated with one of the student booths of the teaching machine shown in FIG. 1.

The dial device, which is located in the student booth, is in general of the same type as commonly used in telephone circuits and is indicated generally by the broken line circle 58. Included in the dial device 58 are a pair of interrupter contacts 1 and 2 and off-normal contacts 3, 4 and 5. The contacts 1 and 2, 3 and 4, and 4 and 5 are open when the dial is in its normal or at rest position, and are closed when the dial is moved from its normal position toward a selected dial digit. The contacts 3 and 4 and 4 and 5 remain closed during the return of the dial, whereas the interrupter contacts 1 and 2 during the return of the dial are opened for a number of times corresponding to the number of the dialed digit. For example, if the digit dialed is 6 the interrupter contacts 1 and 2 are closed as the dial is moved to 6 and then opened and closed six times while the dial returns to its normal position. At the same time, the contacts 3 and 4 and 4 and 5 are closed as the dial is moved from its normal position and remain closed until it again returns to the normal position.

The interrupter contact is contact is connected by means of the line 36 to the coil of a transponder relay M, the other side of which coil is connected to a source of negative potential, as indicated. The transponder M includes contacts 1 and 2 which are closed each time the relay coil is energized by a positive or ground pulse transmitted thereto by the line 36. These contacts thus open and close in correspondence to the opening and closing of the interrupter contacts 1 and 2 of the dial 58, the purpose of the relay M being to allow the use of relatively small currents with the dial interrupter contacts 1 and 2.

The closing of the transponder contacts 1 and 2 connects the associated line 60 periodically to ground to cause the appearance of short ground pulses on the line 60 corresponding to the short pulses produced by the operation of the interrupter contacts 1 and 2 of the dial. The short pulses thus generated on the line 60 will accordingly be referred to hereinafter as dial pulses. Also connected to the line 36 is the earphone input line 48, the line 36 serving to transmit earphone input signals to the student booth when the associated dial is in its normal position. From FIG. 1 it will be noted that when the dial is in its normal position the lines 48 and 36 are connected by means of a line 62 and a blocking condenser 64 to the wiper of a volume control potentiometer 66. The blocking condenser serves to block the D.C. resistance of the earphones and of the potentiometer 66 from the line 36 to prevent such resistance from shunting the latter line. Input signals appearing on the wiper of the potentiometer 66 are transmitted to the earphone output contacts 70, 70 of two jacks 72, 72 located in the student booth. The jacks 72, 72 receive a suitable plug for connection with earphones and microphone shown schematically at 74 and 76 respectively. One jack serves to make connection with a student's earphones and microphone while the other jack may be used by a roving teacher or supervisor to connect his earphones and microphone to the student booth to monitor the student's work.

The volume control potentiometer 66 preferably includes a knob operable by the student whereby the student may control the volume of the programs delivered bp his earphones. Each jack 72 also includes a microphone terminal 78 which connects with the microphone output line 52, the line 52 preferably including a switch 80 by means of which the student may switch his microphone into or out of the system. The microphone output and the earphone input lines are shielded and the shields connected to ground by the lines 82 and 84 as shown.

When the dial 58 is moved from its normal position the closing of the contacts 4 and 5 shunts the earphone input to ground through the line 86 and the line 84. Closing of the contacts 3 and 4 connects the interrupter contact 2 to ground to condition the same for the production of dial pulses upon the return of the dial to its normal position.

The logic unit, in addition to the transponder M, further includes five relays A, B, C, G and H and a three bank stepping switch R. The stepping switch R serves as a device for selectively controlling the mode of operation of the associated recorder in response to the receipt of a train of dial pulses, and includes means for restoring the same to a normal or home condition after being stepped to a function select position by a train of dial pulses. The relays A and B together serve as a pulse programmer for causing alternate trains of dial pulses appearing on the line 60 to respectively set and restore the stepping switch R. The relay C operates as a pulse transfer device and operates after the select program digit is dialed and after the stepping switch R is stepped to the corresponding step position and defeats the operation of the pulse programming relays A and B, thereby preventing the restoration of the stepping switch R upon the receipt of the next series of dial pulses. The relay C also when operated produces a call signal which is transmitted to the line-finder to set the latter device in operation and to cause it to lock on the calling logic unit. In the present case this call signal is provided by a pair of contacts which close to provide a positive voltage start signal for initiating operation of the line-finder and by another pair of contacts which close to provide a positive voltage stop signal for causing the line-finder to stop on the calling logic.

The relay G is of the slow release type and operates to create a long pulse whenever the dial is removed from its normal position. That is, whenever the dial is displaced from its normal position the relay G is operated and will remain operated until the dial returns to its normal position. The long pulse formed during this operation of the dial is used to control the operation of the pulse programming relays A and B, there being one long pulse generated for each train of dial pulses produced by the movement operation of the dial. The relay G also serves as part of a circuitry for restoring the various components associated with the student booth to a normal condition when the student is through listening to or recording a selected master program. The relay H is operated at the end of a program selection when the selected program is connected to the calling logic and serves in conjunction with other parts of the system to control the restoration of various components when the student is through with the program.

To consider the components of the logic unit individually and in more detail, it will be noted that the stepping switch R has one side of its stepping coil connected to a line 88 and its other side connected to a source of negative potential. Positive or ground pulses delivered to the stepping coil by the line 88 energize the coil to simultaneously step the three wipers 90, 92 and 94 associated respectively with the three banks of terminals, the wipers being stepped one position for each pulse delivered by the line 88. In the illustrated case the three banks of the switch are shown to include ten terminals in addition to the home terminal. Not all of these terminals are used or necessary in the present machine, but such switches are standard commercially available items and the inclusion of several idle terminals does not interfere with the operation of the present machine. The stepping switch R, as are other stepping switches hereinafter described, is illustrated as being of the type in which the wipers restore in the same direction as that in which they are stepped. For example, the wiper 90 consists of two arms which are rotated in a counterclockwise sense by the operation of the stepping coil. When the wiper is in its home position the two wiper arms engage the two home terminals marked H. When the relay stepping coil is thereafter energized to step the wiper 90, the wiper 90 moves counterclockwise to bring the bottom wiper arm into engagement with a selected step terminal. Thereafter when the switch is restored the same wiper arm will be moved counterclockwise to the upper home terminal. When the switch is again stepped the other wiper arm will be brought into engagement with the next selected step terminal. The other wipers 92 and 94 of the second and third banks of the switch R are similar to the wiper 90 and it is to be understood that the three wipers are operated simultaneously by the stepping coil and that when one wiper engages a terminal of its associated bank the other two wipers will engage the corresponding terminals in their associated banks.

Operation of the stepping coil of the stepping switch R to cause restoration of the wipers 90, 92 and 94 is effected by a pair of interrupter contacts 1 and 2 connected in series with a pair of off-normal contacts 3 and 4. The off-normal contacts 3 and 4 are opened only when the wipers of the switch are positioned on their home terminals and are closed whenever the wipers are displaced from the home terminals. The interrupter contacts 1 and 2 are operated or opened each time the switch steps and are preferably bridged by a spark suppression condenser 96 in accordance with conventional practice. From FIG. 1 it will be noted that the arrangement of the interrupter contacts 1 and 2 and the off-normal contacts 3 and 4 is such that whenever the off-normal contacts 3 and 4 are closed due to the wipers being in an off-normal position the application of a positive ground potential to contact 3 by the line 98 will cause restoration of the switch.

The pulse programming relay A includes a set of make before break contacts 1, 2 and 3 and a pair of normally closed contacts 4 and 5. The associated pulse programming relay B includes a pair of normally closed contacts 1 and 2, another pair of normally closed contacts 3 and 4 and a set of break before make contacts 5, 6 and 7, the movable contact 6 being normally closed on the contact 5 and opened in relation to the contact 7. The dial pulse line 60 is connected to the line 88 leading to the coil of the stepping switch R through the normally closed contacts 3 and 4 of the relay B so that whenever the relay B is released dial pulses generated by the dial will be transmitted to the switch R to step the same. Likewise, whenever the contacts 3 and 4 of the relay B are opened by the operation of the latter relay dial pulses generated by the dial will be prevented from reaching the stepping switch R and will therefore have no effect on the latter. The ground potential utilized for restoring the stepping switch R is derived from the ground line 100 which is connected with the line 98 through the normally closed contacts 4 and 5 of the relay A. Therefore, whenever the relay A is released a restore signal voltage will be transmitted to the stepping switch.

Assuming the logic unit to be in a fully restored state in readiness for operation of the stepping switch R in response to the receipt of the next train of dial pulses, such state being shown in FIG. 1, the operation of the relays A and B, which are initially both released, is such that as the dial is moved away from its normal position the relay A is energized to open its contacts 4 and 5, thereby removing the restore signal from the stepping switch R. As soon as the dial is returned to its normal position the relay B is then operated to open its contacts 3 and 4 with the result that the next train of dial pulses will be prevented from reacting the stepping switch R. When the dial is thereafter again moved away from its normal position to dial another digit the relay A is immediately released. The relay B is thereafter released when the dial returns to its normal position. The release of the relay A closes its contacts 4 and 5 to apply a restore signal to the stepping switch R and the later release of the relay B again connects the line 88 to the dial pulse line 60, by closing the contacts 3 and 4, so that the next train of pulses may again operate the switch R.

To achieve this particular operation of the relays A and B one side of each relay coil is connected to a source of negative potential through an associated resistor, the resistor associated with the relay A being indicated at 102 and that associated with the relay B being indicated at 104. Between the resistor 102 and the coil of the relay A is a shunt line 106 connected to the contact 7 of the relay B. Between the resistor 104 and the coil of the relay B is another shunt line 108 connected to the contact 5 of the relay B. The other or ground sides of the relays A and B are connected to a common line 110 which line is connected in turn to the contact 3 of the relay A. The contact 1 of the relay A is connected to the ground line 100 while the contact 2 thereof is connected to the line 112 which latter line delivers to the pulse programming relays long ground pulses generated by the operation of the relay G. The long pulse line 112 is also connected by means of the line 114 to the contact 6 of the relay B.

The contacts 1 and 2 of the relay B are connected respectively to the lines $38_a$ and 116 and serve in a hereinafter described manner in the control of the recorder function. They do not, however, enter directly into the operation of the pulse programming relays A and B or the operation of the stepping switch R.

Assuming that the relays A and B are both released, a long ground pulse delivered by the line 112 will pass through the closed contacts 2 and 3 of the relay A and energize the coil of the latter relay. At the same time, the long pulse will pass through the closed contacts 5 and 6 of the relay C and shunt the coil of the same through the line 108 to prevent energization of the latter. As soon as the relay A operates, the contacts 1 and 3 are closed so that ground is applied to the line 110 from the line 100, thereby latching the relay A to maintain it in an energized state after the termination of the long pulse. At the end of the long pulse the ground which originally shunted the relay B is removed from the line 112 and the relay B is therefore operated and maintained in an operated condition by the same latching circuit as that associated with the relay A. When the next long pulse appears on the line 112 it passes through the now closed contacts 6 and 7 of the relay B and shunts out the coil of the relay A through the line 106 to release the same. After the relay A is released the contacts 1 and 3 thereof open and the contacts 2 and 3 close, but the contacts 2 and 3 close before the opening of the contacts 1 and 3 so that the line 110 remains grounded until the termination of the long pulse. At the end of the long pulse the relay B does lose its ground and is accordingly released. The relays A and B are thus both released and ready to repeat the same cycle of events above described.

The pulse transfer relay C includes normally closed contacts 1 and 8, a set of break before make contacts 3, 4 and 5 and normally open contacts 6 and 7. The contacts 3 and 4 are normally closed and the contacts 4 and 5 normally open. One side of the relay coil is connected to a source of negative potential through a resistor 120, while the other side is connected by means of a line 122 to the number 6 terminal of the second bank of the stepping switch R. A shunt line 124 is connected between the line 126 and a point between the resistor 120 and the coil of the relay C. The contact 1 is connected to the line 126 which is in turn connected to the line 112, the line 128 and the line $38_g$. The contact 2 is connected by the lines 130 and 132 to the contact 4 of the relay G. The contact 3 is connected by the line 134 to the program selector 18 and serves as part of the circuitry for restoring the same. Contacts 4 and 6 of the relay C are connected to ground as shown. Contact 5 is connected to the line $40_c$ while the contact 7 is connected to the line $40_b$. Both the lines $40_b$ and $40_c$ lead to that portion of the program selector 18 shown in FIG. 4 and are there connected through normally closed contacts to lines leading to the line-finder. When the relay C is energized, a "start" signal is transmitted to the line-finder through the line $40_b$ and a "stop" signal is transmitted to the line-finder through the line $40_c$ as hereinafter described. Here the subscripts $b$ and $c$ are used to indicate that the lines $40_b$ and $40_c$ form part of the line 40 shown in FIG. 1, and other letter subscripts are used for the same purpose hereinafter. As noted the lines $40_b$ and $40_c$ in actuality pass through part of the program selector on the way to the line-finder, but this has to do with the circuitry for restoring the line-finder as hereinafter described and has been omitted from FIG. 1 for purposes of clarity.

In passing from one figure to another, it is to be understood that the circles marked A, B, C, etc. in one figure are tied to the correspondingly marked circles in another figure. Therefore, for example, the line 134 which leads to the circle $A_1$ in FIG. 2 is in turn connected with the circle $A_1$ in FIG. 4. Where necessary, the subscripts 1 have been used to designate lines associated with the number 1 logic and student booth of FIG. 1, the logic unit of FIG. 2 being assumed to be the number 1 logic, while the subscripts 2, 3, 4, etc. have been used to designate lines associated with logics or booth numbers 2, 3, 4 etc. respectively.

The relay G may be referred to as a pulse forming relay in that it forms the long pulses which control the operation of the pulse programming relays A and B. The relay G also serves as part of the circuitry for restoring the relay H as hereinafter described. The relay G is of the slow release type and has its coil connected on one side to the dial pulse line 60 through the line 140, its other side being connected to a negative potential as shown. At the start of a train of dial pulses appearing on the line 60 the relay G is energized and it remains energized until the train of pulses is completed. Associated with the coil of the relay G are a pair of normally closed contacts 1 and 2 and a pair of normally open contacts 3 and 4. Contact 1 is connected by the line 142 to that portion of the program selector shown in FIG. 4. Contact 2 is connected by the line 144 to one side of the coil of the relay H. These two contacts control the energization of the relay H as hereinafter described. Contact 3 is connected to ground, as shown, and contact 4 is connected to the line 132. When the contacts 3 and 4 are closed and the relay C released the long pulse line 112 is connected to ground through the line 132, the line 130, the contacts 1 and 2 of the relay C, and the line 126. Therefore, so long as the relay C remains released a long ground pulse will be transmitted to the line 112 whenever the relay G is energized, and this energization of the relay G occurs throughout the course of each train of dial pulses appearing on the line 60, the relay G thus producing one long pulse for each train of dial pulses.

The relay H serves primarily as part of a circuitry for restoring the line-finder and other parts of the machine to a given condition after the student is through listening to or recording the selected program. As mentioned previously, one side of the coil of the relay H is connected to the line 144. The other side of the coil is connected to a ground line 146 and between the two coil terminals is a condenser 148 which serves to delay the release of the relay H for a purpose hereinafter made evident. Associated with the coil of the relay H are a pair of normally closed contacts 1 and 2, a pair of normally open contacts 3 and 4 and another pair of normally open contacts 5 and 6. The contact 1 is connected by the line 150 to that portion of the program selector shown in FIG. 4. The contact 2 is in turn connected by the line 152 to that portion of the line-finder shown in FIG. 3. The contact 3 is connected by the line 154 to the line 132, while the contact 4 is connected to the line 128. The contacts 3 and 4 when closed serve to deliver long pulses generated by the relay G to the long pulse line 128 to operate the pulse programming relays A and B, thereby overriding the restore defeat function of the relay C. The contact 5 of relay H is connected to the ground line 146 while the associated contact 6 is connected by the line 156 to that portion of the program selector shown in FIG. 4.

The operation of the logic unit shown in FIG. 2 will be described hereinafter in conjunction with the other components of the machine. It is to be understood however, that this logic is designed for use with an audio-active-comparative type of machine and that for other less complex types such as audio-active or audio-passive, simplifications may be made in the logic unit. For example, in the latter two types of machine student recorders are omitted from the machine and therefore the logic unit may be modified to omit the stepping switch R and other recorder function control means. The logic unit would thus be used only to control the operation of the program selector to make proper selection of the program and to restore the program selector at the end of a received program. It is also contemplated that even in an audio-active-comparative machine the function of the student recorder could be controlled by a separate selector switch separate from the dial means and logic unit.

LINE-FINDER—FIG. 3

Figure 3:
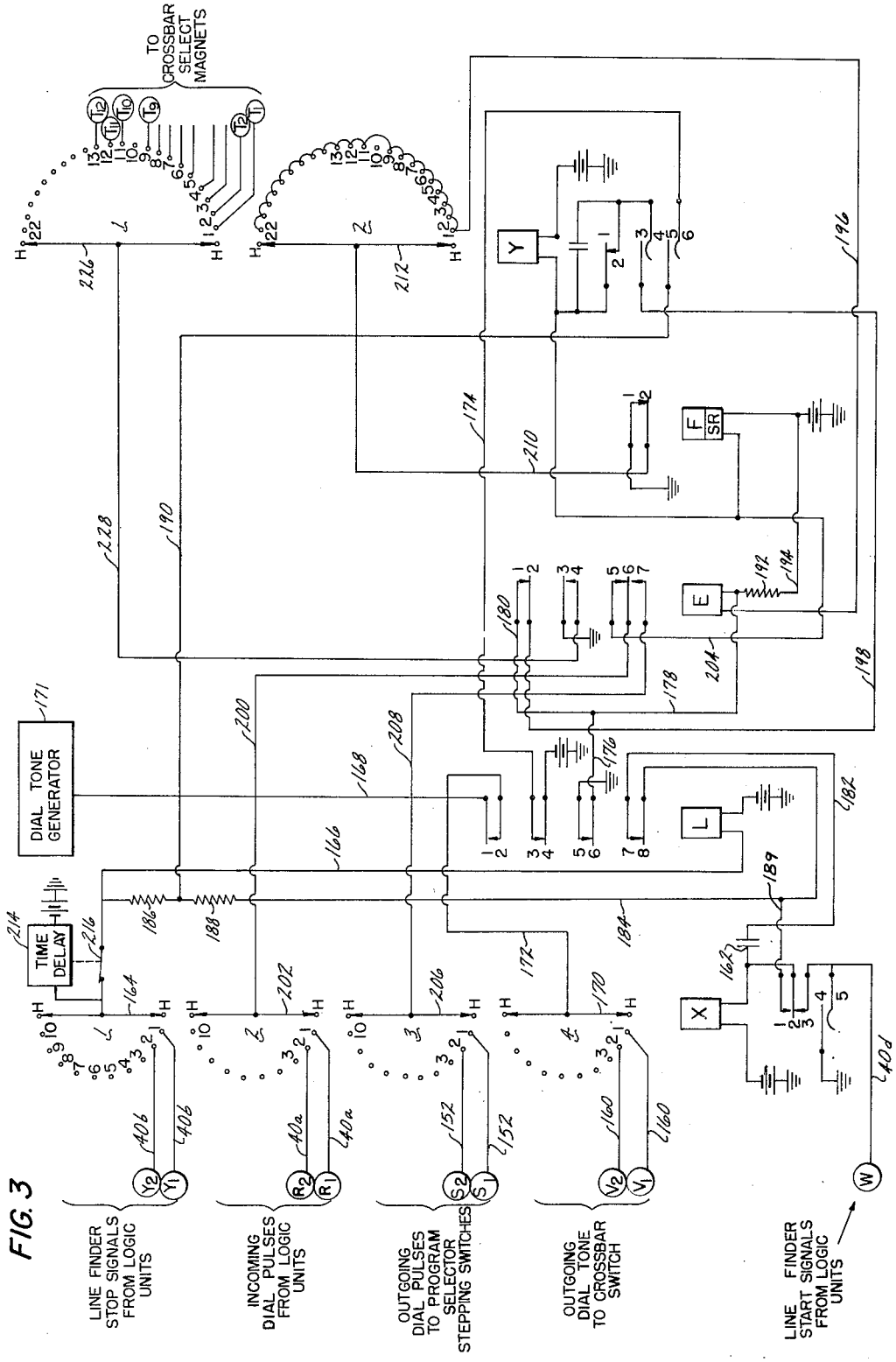
FIG. 3 is a wiring diagram of the line-finder and part of the program selector of the teaching machine of FIG. 1.

Reference is now made to FIG. 3 wherein is illustrated in diagrammatic form the construction of a typical line-finder 16 employed with the teaching machine of FIG. 1. This line-finder comprises a four bank stepping switch X, hereinafter referred to as the line-finder stepping switch. The stepping switch Y illustrated in FIG. 3 comprises part of the program selector 18 and will be hereinafter described in the section devoted to the program selector. The three relays L, E and F comprise part of the circuitry connecting the line-finder to the program selector and serve among other things to control the routing of trains of pulses to different parts of the program selector. They may therefore be considered as part of either the line-finder or the program selector, but for the present will be discussed as part of the line-finder.

The line-finder stepping switch X is a four bank, eleven position switch with each bank thereof containing a pair of home terminals marked H and ten active or step terminals marked 1 to 10 inclusive. Each active terminal of each bank is in turn associated with the logic unit or other equipment of a corresponding student booth. For example, each terminal marked 1 is asssociated with equipment belonging to booth 1, each of the terminals marked 2 is associated with equipment belonging to booth 2, etc. The active terminals of the first bank of the stepping switch X are connected to the line-finder stop signal lines $40_b$, $40_b$ which lines lead to the line-finder from the associated logic units and through part of the program selector. Only two lines are shown connected to each blank of the line-finder stepping switch X, but it is to be understood that other similar lines are or may be connected thereto and associated with still other student booths.

The active terminals of the second bank of the line-finder stepping switch are connected respectively to the lines $40_a$, $40_a$, which transmit incoming dial pulses to the line-finder. The third bank of the switch has its active terminals connected to lines 152, 152, which transmit outgoing dial pulses to the portion of the program selector shown in FIG. 4. The fourth bank has its active terminals connected to lines 160, 160, which transmit dial tones to the calling logic units. Associated with the coil of the line-finder stepping switch X is a set of interrupter contacts 1, 2 and 3 and a pair of off-normal contacts 4 and 5. The interrupter contacts 1 and 2 are normally open and are closed each time the coil is stepped. The contacts 2 and 3, on the other hand, are normally closed and are opened during the course of each step. The off-normal contacts 4 and 5 are open only when the wipers of the switch are in their home positions and are closed whenever the wipers are moved to an active terminal. One side of the coil of the line-finder stepping switch X is connected to a negative potential as shown, while the other side is connected through the normally closed interrupter contacts 2 and 3 to the line $40_d$. The line $40_d$ is a start signal line for the line-finder and is connected through contacts in the program selector to the start signal lines $40_c$, $40_e$ associated with the various logic units. Also connected to the same side of the relay coil as the interrupter contact 2 is a condenser 162 which serves as hereinafter described to prevent the stepping switch from latching on a calling line until the program selector is in a fully restored condition.

The relay L has one side of its coil connected to the wiper 164 of the first bank of the line-finder stepping switch X by the line 166. The other side of this coil is connected to a negative potential as shown so that whenever a positive or ground potential appears on the line 166 the relay L will be operated. Associated with the coil are one pair of normally open contacts 1 and 2 and three pairs of normally closed contacts 3 and 4, 5 and 6, and 7 and 8. The contact 1 is connected by the line 168 to a suitable dial tone generator 171 which imposes on the line 168 a tone signal of a desirable fixed audio frequency. The contact 2 is connected to the wiper 170 of the fourth bank of the stepping relay X by the line 172 so that whenever the contacts 1 and 2 are closed by the operation of the relay L the dial tone signal will be fed to the wiper 170. The contacts 3 and 4 comprise part of a circuit for preventing latching of the line-finder stepping switch X on a new calling line $40_b$ until the program selector 18 is fully restored, the contact 4 being connected to a source of negative potential as shown and the contact 3 being connected by means of a line 174 to an off-normal contact 6 on the stepping switch Y of the program selector. Contact 5 is connected to ground and contact 6 is connected by shunt lines 176 and 178 to one side of the coil of the relay E and by the lines 176 and 180 to the contact 1 of the latter relay. Contact 7 is connected to one side of the condenser 162 by means of the line 182. Contact 8 is connected with the wiper of the first bank of the stepping switch X by the line 184 which line contains two resistors 186 and 188 connected in series between the wiper 164 and the contact 8. The junction of the two resistors 186 and 188 is connected by a line 190 to the off-normal contact 5 of the stepping switch Y of the program selector. The line 184 is also connected to the number 1 interrupter contact of the stepping switch X by the line 189.

The relay E as noted previously has one side of its coil connected to the shunt line 178. The same side of the coil is also connected through a resistor 192 and a line 194 to a source of negative potential as shown. The other side of the coil is connected to the active terminals of the second bank of the program selector stepping switch Y by the line 196. Included in the relay E are a pair of normally closed contacts 1 and 2, a pair of normally open contacts 3 and 4, and a set of break before make contacts 5, 6 and 7. The contacts 5 and 6 are normally closed and the contacts 6 and 7 are normally open. The contact 1 is connected to the line 180 as previously mentioned and the contact 2 is connected by the line 198 to the off-normal contact 3 of the program selector stepping switch Y. The third contact is grounded as shown, while the associated fourth contact is connected by a line 228 to the wiper 226 of the first bank of the program selector stepping switch Y. The fifth contact controls the energization of the relay F and of the program selector stepping switch Y and is connected to one side of each of the coils of the latter two devices by the line 204. The sixth contact is connected to a line 200 which receives incoming dial pulses from the wiper 202 of the second bank of the stepping switch X. The seventh terminal is connected to the wiper 206 of the third bank of the stepping switch X by the line 208. It will at this point be noted that the contacts 5, 6 and 7 of the relay E serve to selectively connect incoming dial pulses appearing on the line 200 with the coil of the stepping switch Y and the coil of the relay F or with the line 208 in accordance with the state of energization of the relay E.

The relay F is of the slow release type which is energized at the initiation of a train of dial pulses on the line 204 and which remains energized until the termination of such a train of pulses, one side of the coil of the relay being connected to the line 204 and the other side connected to a source of negative potential as shown. Associated with the coil of the relay F are two normally closed contacts 1 and 2. The contact 1 is grounded while the contact 2 is connected by the line 210 to the wiper 212 of the second bank of the stepping switch Y. Therefore, whenever the relay F is released the wiper 212 of the stepping switch Y is grounded.

At this point it should be noted that when a student dials the call digit, in this case the digit 6, the relay C in his associated logic unit will be operated causing a positive or ground potential to be applied to the associated line-finder stop line $40_b$ and to the line-finder start line $40_a$. The ground signal on the start line $40_d$ passes through the interrupter contacts 2 and 3 of the line-finder stepping switch X and starts the latter switch stepping in search for the grounded terminal of its first bank. When the wiper 164 of the first bank engages the terminal grounded by the calling line $40_b$ the ground potential is applied through the resistors 186 and 188 and the line 184 to the first interrupter terminal which causes the stepping switch to latch in the position corresponding to that of the grounded terminal engaged by the wiper 164. It should also be noted that the relative values of the resistors 186 and 188 and the capacitor 162 are such that the stepping switch X will not latch without the capacitor 162 being in the circuit. That is, the current to the coil of the stepping switch X is limited by the resistors 186 and 188 and is of such a value as to be capable of holding the switch in a latched or operated condition but incapable of initially operating the switch without the aid of the capacitor 162, it requiring a larger current to operate the switch than to hold it in the operated condition once operated. The relay L is also designed to be somewhat slow in operating so that when a ground potential does appear on the wiper 164 the stepping switch X will latch before the relay L operates to open the contacts 7 and 8 thereof to drop the capacitor 162 out of the circuit. Once the stepping switch is latched, however, the current flowing through its coil is sufficient to maintain the same in a latched condition after the relay L is operated and the capacitor 162 removed from the circuit.

When the stepping switch does stop on the grounded terminal of the first bank the wiper 202 of the second bank engages the terminal associated with the calling logic so that dial pulses appearing on the dial line $40_a$ of the calling logic are transmitted to the line 200. After sufficient dial pulses have passed through to the line 200 to make a complete program selection, restoring circuitry within the program selector removes the stop signal from the associated line $40_b$ to free the line-finder for use with other calling lines. It will also be obvious that in the event one student dials the call number 6 and then fails to follow the dial of this digit with the dial of a complete set of program selecting digits he may tie up the line-finder and prevent it from moving to other calling lines. To overcome such occurrence the line-finder of FIG. 3 further includes a time delay device or relay 214 which controls a switch 216 located between the wiper 164 and the lines 166 and 184 as shown. The switch 216 is normally closed and the time delay device 214 operates to open the switch 216 after the lapse of a given amount of time, for example fifteen seconds, following the appearance of a ground potential on the wiper 164. If the student hesitates in dialing the program number, the switch 216 will be opened by the device 214 after the lapse of the delay period, thereby removing the stop signal from the interrupter contact 1 of the line-finder and permitting the stepping switch to proceed to another calling line and to stop on the same after the switch 216 recloses.

PROGRAM SELECTOR—FIGS. 3 AND 4

Figure 4:
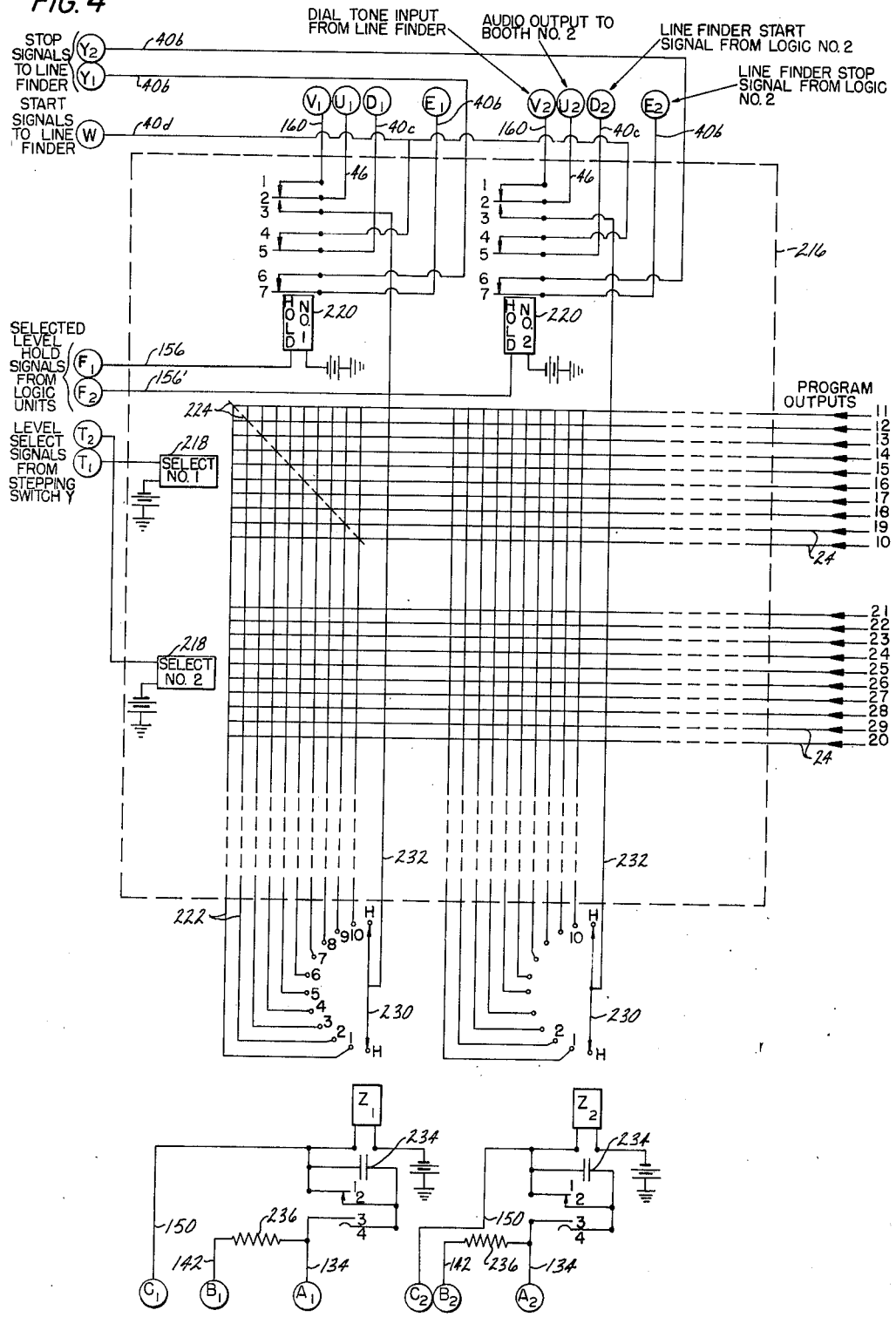
FIG. 4 is a wiring diagram of the crossbar switch and other associated apparatus comprising the remaining portion of the program selector of the teaching machine of FIG. 1.

The program selector indicated at 18 in FIG. 1 is shown schematically in FIGS. 3 and 4. The operation of the program selector is such that a group of master program outputs is selected by the first one or two received trains of dial pulses and one program output of the selected group is selected by the next received train of dial pulses.

The means for making the group selection includes a crossbar switch 216, indicated schematically within the broken line rectangle of FIG. 4, and which crossbar switch is controlled in part by the stepping switch Y illustrated in FIG. 3. The selection of individual programs from the groups of programs selected by the crossbar switch is performed by a group of stepping switches $Z_1$, $Z_2$, etc. associated with the crossbar switch 216 and each of which stepping switches corresponds to a respective one of the student booths, the stepping switch $Z_1$ corresponding to the student booth number 1, the switch $Z_2$ corresponding to the student booth number 2, etc. The crossbar switch 216 is of conventional construction and may, for example, be of the type manufactured by North Electric Company of Galion, Ohio, and described in their Industrial Bulletin No. 204-52. The switch 216 contains a plurality of horizontal or select levels and a plurality of vertical or hold columns. Associated with each horizontal level is a select magnet 218 and associated with each vertical column is a hold magnet 220. Each hold magnet is associated with a corresponding student booth while each select level is associated with a corresponding group of master program outputs. In the present instance where there is an intended capability of ten student booths per linefinder and program selector, the program selector crossbar switch 216 includes ten hold columns, and preferably also includes a total of twelve select levels. Each select level as shown in the present instance is associated with ten separate program outputs so that the twelve select levels are in total capable of accommodating one hundred and twenty (120) master program outputs. In FIG. 4 only part of two select levels and part of two hold columns have been illustrated diagrammatically for the purpose of explanation. Associated with each hold column are ten output lines 222, 222, and the operation of the switch is such that upon the energization of a given select magnet 218 followed by the energization of a given hold magnet 220 the program output lines 24, 24 associated with the energized select magnet are connected respectively with the output lines 222, 222 associated with the energized hold magnet. For example, if the number 1 select magnet is energized and followed by the energization of the number 1 hold magent, contacts in the switch will be closed at the points indicated by the broken lines 224, 224 so that the upper group of program output lines 24, 24 are connected respectively with the left group of output lines 222, 222. In making a group selection by means of the crossbar switch 216 the select magnet must be energized slightly before the hold magnet and after the hold magnet is energized the select magnet may be released and the closed contacts will be held in a closed condition by the energization of the hold magnet.

Associated with each hold magnet 220 in the crossbar switch 216 are a plurality of off-normal contacts, these contacts including a set of break before make contacts 1, 2 and 3, a pair of normally closed contacts 4 and 5 and another pair of normally closed contacts 6 and 7. The contacts 1 and 2 are normally closed and the contacts 2 and 3 are normally open. The contacts 6 and 7 are connected in series in the associated linefinder stop signal line $40_b$ as shown and function when the associated hold magnet is energized to open the circuit between the logic and the line-finder to remove the stop signal from the line-finder.

The number 5 contacts of the hold magnets 220, 220 of the crossbar switch are connected respectively to the incoming line-finder start signal lines $40_c$ from the associated logic units, and all of the number 4 contacts are connected in common to the line-finder start line $40_d$ leading from the crossbar switch to the coil of the line-finder stepping switch X. Therefore, a start signal appearing on any of the lines $40_c$, $40_c$ will start the line-finder stepping switch X in search for the calling logic provided the associated contacts 4 and 5 are closed.

The contact 1 of each hold magnet is connected to the associated dial tone line 160, the contact 2 is connected to the audio output line 46, and the contact 3 is connected to the line 232 which, as hereinafter described, is connected to the selected program after the selection is made. Thus, when the contacts 1 and 2 are closed any dial tone appearing on the line 160 is transmitted to the audio output line, and when the contacts 2 and 3 are closed any program output appearing on the line 232 is transmitted to the audio output line.

The energization of the crossbar select magnets 218, 218 is selectively controlled in response to the number of pulses in the first one or two incoming dial pulse trains by the program selector stepping switch Y illustrated in FIG. 3. The stepping switch Y has two banks of terminals each including twenty-two active terminals and two home terminals. Actually, as in the present case, where the crossbar switch 216 includes twelve select magnets only thirteen active terminals are required on each bank of the stepping switch Y, but since switches with twenty-two terminals in each bank are more common and are readily available commercially this type of switch has been shown by way of example.

The first nine active terminals of the first bank of the stepping switch Y are connected respectively to the first nine level select magnets 218, 218 of the crossbar switch 216. The tenth terminal is unconnected to anything else, and the terminals 11, 12 and 13 are connected respectively to the tenth, eleventh and twelfth level select magnets of the crossbar switch 216. All of the active terminals of the second bank of the stepping switch Y are connected together and are in turn connected by the line 196 to the ground side of the coil of the relay E, except for the tenth terminal to which no connection is made. As brought out in more detail hereinafter, no connection is made to the tenth terminal of either of the two banks of the stepping switch Y in order to allow for the selective energization of any one of the twelve level select magnets on a twelve level crossbar switch by a telephone type dial capable of generating a maximum number of ten pulses per pulse train. As previously mentioned, the wiper 226 of the first bank of the stepping switch Y is connected to the fourth contact of the relay E by the line 228, therefore whenever the contacts 3 and 4 of the relay E are closed by the operation of the latter relay the wiper 226 will be connected to ground and the crossbar level select magnet associated with the terminal engaged by the wiper 226 will be energized.

Assuming for purposes of explanation that the stepping switch X has been stepped to the number one position so that the four wipers thereof are in engagement with the corresponding number 1 terminals, incoming dial pulses from the number 1 logic appearing on the associated line 40ₐ will pass through the wiper 202, the line 200, the closed contacts 5 and 6 of the relay E and the line 204 to the coil of the stepping switch Y to step the latter in accordance with the number of pulses in the dial train. If the number of pulses in the dial train is less than nine the wipers 212 and 226 will be stepped to the terminals corresponding in number to the number of pulses in the train. For example, if there are six pulses in the dial train the wipers 212 and 226 will be moved simultaneously to the associated number six terminals. As soon as the train of pulses appears on the line 204, it also operates the slow release relay F which remains operated until the end of the dial train. Thus, at the initiation of the dial train the contacts 1 and 2 of the relay F open so that ground potential is moved from the wiper 212. At the end of the dial train, however, and after the wiper 212 is brought into engagement with the selected terminal, the contacts 1 and 2 of the relay F close to apply ground to the wiper 212, and this ground is transmitted by the line 196 to the relay E to operate the same. Operation of the relay E opens the associated contacts 5 and 6 and closes the contacts 6 and 7 so that the next train of dial pulses appearing on the line 200 is transferred to the line 208 and from there out through the third bank of the line-finder switch X to the program selector stepping switch Z associated with the calling logic. When the relay E operates it also closes contacts 3 and 4 thereof which connects the wiper 226 to ground and thereby energizes the level select magnet connected to the terminal engaged by the wiper.

Assume now, however, that the first train of dial pulses appearing on the line 200 includes the maximum number of ten pulses. These pulses will pass through the closed contacts 5 and 6 of the relay E and cause the wipers 212 and 226 of the stepping switch Y to be stepped to the tenth step position. In this position, the wiper 212 of the second bank engages the tenth terminal thereof which is unconnected to the line 196. Therefore upon the release of the relay F at the termination of the train of pulses no ground signal is applied to the relay E and the relay E thus remains unoperated. Accordingly, the contacts 5 and 6 of the relay E remain closed and the next train of dial pulses appearing on the line 200 will be again routed to the coil of the stepping switch Y rather than transferred to the associated program selector switch Z. Thus, following the dial of the call digit 6 the student may dial the digit "0" to move the wipers of the stepping switch Y to the tenth position and thereafter dial either the digit 1, 2 or 3 to cause the wipers 212 and 226 to be moved to the eleventh, twelfth and thirteenth position respectively. When in engagement with the eleventh terminal of the first bank the wiper 226 energizes the tenth level select magnet of the crossbar switch, and it energizes the eleventh and twelfth select magnets when in engagement with the twelfth and thirteenth terminals respectively. It will be noted, however, that the energization of the selected crossbar level select magnet does not occur until the relay E is energized to cause the contacts 3 and 4 thereof to be closed. This energization of the relay E, in turn, will not occur until the release of the relay F at the end of the dial train.

Referring to FIG. 4, it will be noted that each program selector stepping switch Z includes one bank of terminals including ten active terminals and a pair of home terminals adapted for engagement by a rotary wiper 230. The ten active terminals are connected respectively with the ten output lines 222, 222 of the associated vertical column of the crossbar switch 216. The wiper 230 is in turn connected by the line 232 to the number 3 contact of the associated crossbar hold magnet 220. As previously mentioned, when the associated hold magnet 220 is energized the contact 3 thereof is engaged by the contact 2 and a closed circuit completed between the line 232 and the audio output line 46 so that any program signal appearing on the wiper 230 will be transmitted by the line 46 to the amplifiers of the associated student booth. What program appears on the wiper 230 will, of course, depend on the step position of the wiper and the group of program inputs connected to the crossbar output lines 222, 222 by the associated hold magnet. For example, if the hold magnet number 1 connects the upper group of ten input lines 24, 24 to the associated ten output lines 222, 222, due to the level select magnet number 1 being energized before the hold magnet, and the wiper 230 of the stepping switch Z is stepped to the number 3 terminal, the number 13 program input will be connected to the wiper 230 and transmitted by the line 232 to the audio output line 46.

Associated with the stepping coil of each program selector stepping switch Z are two interrupter contacts 1 and 2 and two off-normal contacts 3 and 4. The interrupter contacts 1 and 2 are normally closed and are opened each time the switch is stepped and the off-normal contacts 3 and 4 are open only when the associated wiper is in the home position. Across the interrupter contacts 1 and 2 is a spark suppression condenser 234 in accordance with conventional practice. One side of the coil is connected to a source of negative potential as shown and the other side is connected to the line 150. The line 150 comes from the associated logic unit and is connected through the normally closed contacts 1 and 2 of the logic relay H to the associated line 152, the latter in turn being connected to the corresponding terminal of the third bank of the line-finder stepping switch X. In other words the line 150 is connected to a terminal in the third bank of the line-finder stepping switch X through a pair of contacts in the logic unit.

It will be recalled that after the stepping of the select level stepping switch Y by the first and possibly second trains of incoming dial pulses appearing on the incoming line 200 the next train of dial pulses is transferred by the relay E to the wiper 206 of the third bank of the line-finder stepping switch. These dial pulses will accordingly be transmitted to the corresponding program selector stepping switch Z through the lines 152 and 150 to step its wiper 230 to the step position corresponding to the number of pulses in the dial train.

The off-normal contact 3 of each stepping switch Z is connected to a restore line 134 which is in turn connected to the third contact of the relay C in the associated logic unit. From FIGS. 2 and 4 it will be obvious that when the relay C is released a ground or positive signal is applied to the line 134 and that this will cause the associated stepping switch Z to restore by automatically stepping to its home position.

As shown in FIG. 4, each contact 5 is also connected through a resistor 236 to the associated line 142. The line 142 in turn leads to the coil of the relay H of the associated logic unit through the normally closed contacts 1 and 2 of the relay C and the line 144. The line 142 serves to energize the coil of the relay H when the stepping switch Z is in an off-normal position, a closed circuit being formed through the now closed off-normal contacts 3 and 4, the interrupter contacts 1 and 2, and the coil of the stepping switch Z to the source of negative potential. In other words, upon the release of the relay G at the end of the last train of program selecting pulses, which pulses step the stepping switch Z, the relay H is energized by the closing of the contacts 1 and 2 on the relay G and by the closed off-normal contacts 3 and 4 of the stepping switch. Thus, the relay H operates at the end of the program selection process and, as hereinafter described, will remain operated for so long as the selected program is transmitted to the associated student booth. As hereinafter described in connection with the operation of the over-all system, the contacts 3 and 4 on the relay H when closed bypass the open contacts 1 and 2 of the relay C so that the next long pulse produced by operation of the dial will cause the relays A and B to be restored to their normal condition, thereby also restoring the stepping switch R and the relay C. Contacts 1 and 2 on the relay H are normally closed and when opened by the energization of the relay H serve to disconnect subsequent dial pulses from the stepping switch Z. Contacts 5 and 6 when closed apply ground to the associated hold magnet 220 in the crossbar switch to energize the same. This restores the line-finder stepping switch X and the stepping switch Y by opening the line-finder start signal contacts 4 and 5 and the line-finder stop signal contacts 6 and 7 associated with the hold magnet. It also disconnects the audio output line from the dial tone line by opening the contacts 1 and 2 and connects the audio output line to the program line 232 by closing the contacts 2 and 3.

STUDENT RECORDER FUNCTION CONTROL MEANS—FIGS. 5, 6 AND 7

Figure 5:
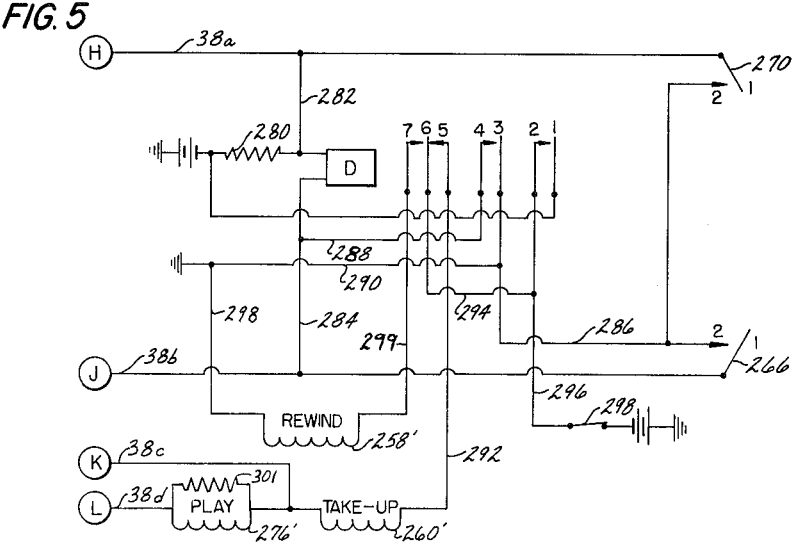
FIG. 5 is a wiring diagram of the tape transport mechanism of one of the student recorders employed in the teaching machine of FIG. 1.
Figure 6:
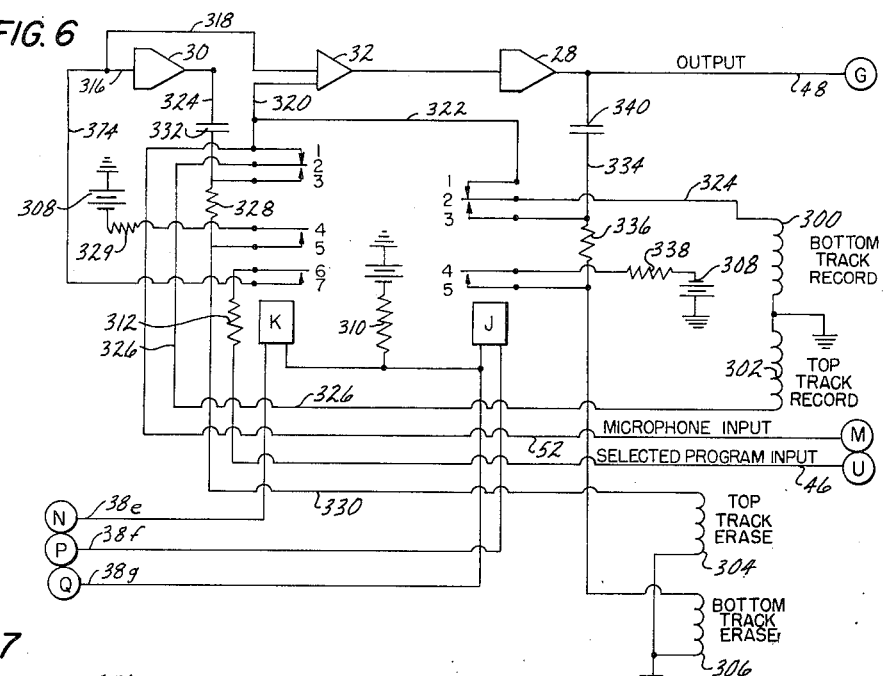
FIG. 6 is a wiring diagram of the means employed in a student recorder for effecting and controlling the recording and retrieval of information onto and from the tape.
Figure 7:
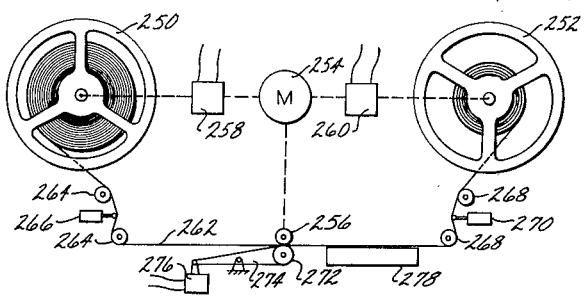
FIG. 7 is a schematic view of a student recorder employed in the teaching machine of FIG. 1 and further illustrates the tape transport mechanism thereof.

The control for one of the student recorders indicated schematically at 14 in FIG. 1 is illustrated in FIGS. 5, 6 and 7.

Referring first to FIG. 7, which illustrates somewhat schematically the tape transport mechanism, it will be observed that the illustrated recorder is of the type including a payout reel 250 and a takeup reel 252, the reels being preferably releasably connected with suitable support and drive means on the tape deck assembly to allow the reels and tape to be removed from and replaced on the tape deck. A single motor 254 directly drives a tape feed capstan 256 and also drives the payout reel 250 through an electromagnetic clutch 258 and the takeup reel 252 through another electromagnetic clutch 260, suitable driving means connecting these various elements being indicated by the broken lines in FIG. 7. As it leaves the payout reel 250, the tape 262 passes over two idler rolls 264, 264 and engages the operating arm of a micro-switch 266. The switch 266 is of the spring biased return type and in its unactuated position holds the tape 262 in a deflected position, as shown in FIG. 7, somewhat out of the path it would otherwise follow in traveling between the idler rolls 264, 264. The tape is held in its deflected position against the spring bias of the switch 266 and the action is such that when the end of the tape on the reel 250 is reached the tension imparted to the tape will tend to stretch the tape between the two idler rolls 264, 264 and cause the micro-switch 266 to be actuated. As explained hereinafter, this operation of the micro-switch 266 causes the tape to be immediately rewound on the payout reel 250.

Two other idler rollers 268, 268 and a micro-switch 270 are also associated with the takeup reel 252. The operation and location of the rolls 268, 268 and of the micro-switch 270 with respect to the takeup reel 252 are in general the same as the operation and location of the idler rolls 264, 264 and of micro-switch 266 with respect to the payout reel 250. The micro-switch 270 is operated when the tape 262 is fully unwound from the take-up reel 252 and rewound on the payout reel 250, the operation of the micro-switch 270 causing the machine to stop its rewinding function.

The capstan 256 is driven continuously and at a constant rate of speed by the motor 254 and cooperates with a pinch roller 272 carried by a pivoted arm 274 which arm is in turn operated by a solenoid 276. The solenoid 276 when actuated moves the arm 274 to in turn move the pinch roll 272 toward the capstan 256 so as to pinch the tape 262 against the continuously rotating capstan. The capstan thus moves the tape at a constant rate of speed past the recording and erase heads which are conveniently located within a housing 278. At the same time as the solenoid 276 is actuated to cause feeding of the tape by the capstan 256 and the pinch roll 272, the electromagnetic clutch 260 is partially energized so that a torque is applied to the takeup roll 252 whereby the latter is rotated to wind the tape pulled from the payout reel 250 by the capstan. At this time the electromagnetic clutch associated with the payout reel 250 is released so that the latter reel may rotate freely to allow the tape to be pulled therefrom by the capstan. To rewind the payout reel 250, the clutch 258 is energized and the clutch 260 and solenoid 276 are de-energized. To cause fast forward travel of the tape 262 the clutch 260 is fully energized and the clutch 258 and solenoid 276 are de-energized. In FIG. 5 only the coils of the solenoid 276 and of the clutches 258 and 260 have been indicated, and these coils have been given the same numbers, except for being primed, as the corresponding devices in FIG. 7. The electromagnetic clutches 258 and 260, it will be understood, are of the type which transmit a variable amount of torque, the amount of torque transmitted increasing with increases in the current flowing through the coil of the device. Also, if desired, separate motors could be employed for the two reels 250 and 252 in which case the coils 258' and 260' shown in FIG. 5 would represent the field coils of the motors instead of solenoid coils of the clutches.

FIG. 5 shows a wiring diagram of the tape transport mechanism and of means for controlling the latter to cause the tape to be moved forwardly at the normally playing or recording speed, forwardly at a fast speed, or rearwardly at a fast rewind speed. This control means is in turn adapted to respond to positive or ground function control signals received from the associated logic unit.

From FIG. 5 it will be noted that in addition to the micro-switches 266 and 270 the control for the coils 258, 260 and 276 further includes a relay D. Associated with the coil of the relay D are a pair of normally open contacts 1 and 2, another pair of normally open contacts 3 and 4, and a set of break before make contacts 5, 6 and 7. One side of the coil of the relay D is connected to a source of negative potential through a resistor 280 and is also connected to the incoming line $38_a$ by a shunt line 282, the incoming line $38_a$ also being connected to the first terminal of the micro-switch 270. The other side of the coil of the relay D is connected to the incoming line $38_b$ by the line 284. Thus, a positive or ground potential appearing on the incoming line $38_b$ will operate the relay D while a positive or ground potential appearing on the line $38_a$ will shunt out the relay to release the same or to prevent its operation regardless of the presence or absence of a signal on the line $38_b$. The line $38_b$ is also connected to the first terminal of the micro-switch 266. The second terminals of the micro-switches 266 and 270 are connected together and to the number 3 contact of the relay D by the line 286, as shown.

The number 3 and 4 contacts of the relay D comprise part of a latching circuit for holding the relay in an operated condition after the same is operated by a positive or ground signal appearing on the line $38_b$, the contact 4 being connected to the line 284 by the line 288 and the contact 3 being connected to ground through the line 290. It will also be noted that the coil of the relay D may be energized by the closing of the contacts 1 and 2 of the micro-switch 266. When these contacts are closed a closed circuit is formed by the grounded line 290, to the line 286, the micro-switch 266, the line $38_b$ and the line 284 to the coil of the relay D.

The contacts 5, 6 and 7 of the relay D control in part the energization of the rewind, play and takeup coils 258', 260' and 276'. When the relay is de-energized the normally closed contacts 5 and 6 supply a negative potential to the right-hand side of the takeup coil 260', this potential being transmitted thereto by the line 292, the closed contacts 5 and 6, the line 294 and the line 296. In the line 296 is an on-off switch 298 which switch is preferably located in the teacher's console and may be used to turn the recorder on at the beginning of a class and off at the end. The positive or ground potentials for energizing the takeup and play coils 260' and 276' are supplied by the lines $38_c$ and $38_d$ coming from the associated logic unit. It will be observed that when a ground potential appears on the line $38_c$ the takeup coil 260' will be fully energized and the play coil 276' will be completely de-energized. Accordingly, the pinch roll 272 will be removed from engagement with the tape 262 and a high torque will be transmitted by the electromagnetic clutch 260 to the takeup reel 252 so that the motor 254 will drive the latter reel at a fast speed to move the tape in a fast forward direction. When a positive or ground signal appears on the line $38_d$ the play coil 276' and the takeup coil 260' are both simultaneously energized, but with the takeup coil 260' being energized to a lesser extent than previously due to its being connected in series with the play coil 276'. Also, in cases where the play coil has a relatively high resistance it is preferably shunted by a resistor 301 as shown so as to increase the voltage to the takeup coil 260. Accordingly, when the line $38_d$ receives a ground signal the solenoid 276 is operated to bring the pinch roll 272 into tape feeding relationship with the capstan 256 thereby causing the tape to be moved at a constant speed through the tape transport mechanism, and the takeup clutch 260 is partially energized to cause the takeup reel 252 to wind the tape fed through the capstan and pinch roller.

When the relay D is operated the contacts 6 and 7 thereof are closed which causes the rewind coil 258' to be energized, a closed circuit being formed from the negative line 296 through the line 294, the closed contacts 6 and 7, the line 299, the coil 258' and the line 298 to ground as indicated. At the same time the play coil 276' and the takeup coil 260' are de-energized by the opening of the contacts 5 and 6. Accordingly, the electromagnetic clutch 258 is energized to rotate the payout reel 250 in the winding direction thereby causing the tape 262 to be rewound on the latter reel at a relatively fast rate.

To summarize the operation of the mechanism shown in FIG. 5, a negative signal appearing on the line $38_b$ operates the relay D to energize the rewind coil 258'. As soon as the relay D is operated a latching circuit is closed through the contact 3 and 4 so that the relay will remain operated after the signal is removed from the line $38_b$. The relay D may also be operated by the closing of the contacts 1 and 2 of the rewind micro-switch 266. After the relay D is operated to energize the rewind coil, it may be released either by a negative signal appearing on the line $38_a$ or by the opening of the micro-switch contacts 1 and 2 of the micro-switch 270. In other words, once the tape deck is started in the rewind mode it will remain in such mode until a stop signal is applied to the line $38_a$ from the logic unit or until the micro-switch 270 is closed by the fact that all of the tape is unwound from the takeup reel 252. When a ground signal is applied to the line $38_c$ the takeup coil 260' is energized to cause the tape to travel in a fast forward direction. When the line $38_d$ is supplied with a ground signal both the play coil 276' and the takeup coil 260' are energized to cause the tape to be transported past the recording and erase heads at the normal playback and record rate of speed.

FIG. 6 shows schematically the mechanism associated with the record and erase heads for imparting and retrieving information to and from the tape 262. In this figure the head for recording or playing back from the bottom track of the tape is indicated at 300 and the head for recording or playing back from the top track of the tape is indicated at 302. The top track erase head is indicated at 304 and the bottom track erase head is indicated at 306. In the illustrated system, D.C. biases are used rather than the more conventional A.C. biases as this combined with the other components of the system has been found to produce a more faithful reproduction of the human voice. In the arrangement illustrated in FIG. 6 the D.C. biasing potentials are supplied from the sources indicated at 303, 308 and these potentials may conveniently be 12 volts whereas the potential of the source or sources used from operating the various relays may be conveniently 24 volts.

The energization of the four heads 300, 302, 304 and 306 is controlled by the two relays K and J. The relay K includes a set of break before make contacts 1, 2 and 3, a pair of normally open contacts 4 and 5, and another pair of normally open contacts 6 and 7. The relay J includes a set of break before make contacts 1, 2 and 3 and a pair of normally open contacts 4 and 5.

The operation of the system shown in FIG. 6 is such that when the relay K is energized the master program output appearing on the line 46 is recorded on the top track of the tape to the exclusion of any other signal. When the relay J is operated the bottom track of the tape has recorded thereon the microphone signal appearing on the line 52 plus either the master program output appearing on the line 46 or the program played back from the top track of the tape. Actually, it is not necessary that anything other than the microphone signal be recorded on the bottom track, but this is done for convenience so that the same amplifiers 32 and 28 may be used to both provide an output for the student's earphones and to provide an output for the bottom track record head. When both the relays J and K are operated recording occurs on both of the tracks of the tape. When the relay K is de-energized information recorded on the top track will be played back and when the relay J is de-energized information recorded on the bottom track will be played back.

The relays of K and J are operated by the tape deck function input lines $38_e$, $38_f$ and $38_g$. The line $38_e$ is connected to one side of the coil of the relay K, the line $38_f$ is connected to one side of the coil of the relay J, and the line $38_g$ is a shunt line connected in common to the remaining two sides of the two relays K and J. The said latter two sides of the relay coils K and J are also connected to a source of negative potential through a resistor 310. From FIG. 6 it will be observed that the arrangement is such that when a positive or ground signal is applied to the line $38_e$ the relay K will be operated, when a negative signal is applied to the line $38_f$ the relay J will be operated, and when a ground signal is applied to the line $38_g$ both relays will be shunted and held in a released condition regardless of whether a ground signal appears on either of the lines $38_e$ and $38_f$. The line $38_g$ may therefore be characterized as a record defeat line and the signals appearing thereon as record defeat signals since such signals defeat any record signals appearing on the lines $38_e$ and $38_f$.

Incoming master program signals are supplied by the line 46 which it will be recalled leads from the wiper of the associated program stepping switch Z. This line is connected through a level matching resistor 312, the contacts 6 and 7 of the relay K, and the lines 314, 316 and 318 to the input sides of the power amplifier 30 and of the preamplifier 32. Since the contacts 6 and 7 of the relay K are normally open it will be noted that the program signal appearing on the line 46 is connected to the amplifiers 30 and 32 only when the relay K is operated. This prevents stray signals picked up by the line 46 from being transmitted to the latter amplifiers when the machine is being operated in the playback mode.

Microphone input signals are supplied by the line 52 which is connected to the number 1 contact of the relay K and which is also connected by the branch line 320 to the input side of the preamplifier 32. Another line 322 also connects the number 1 contact of the relay J to the amplifier input line 320. Thus when the relay J is released its number 2 contact engages the number 1 contact so that playback signals induced in the bottom track record head 300 will be transmitted to the preamplifier 32. Similarly, when the relay K is released the playback signals induced in the top track record head are transmitted through its closed contacts 1 and 2 and to the line 326 to the amplifier input line 320. The microphone input and any playback signals transmitted to the line 320 are amplified by the preamplifier 32 and by the power amplifier 38 and are delivered to the output line 48 which is connected to the earphones in the associated booth so that the student is at all times able to hear his own responses made into the microphone and is also able to hear any information played back from either track of the tape.

The amplified master program signal from the power amplifier 30 is fed by a line 324 to the third contact of the relay K. When the relay K is operated its contacts 2 and 3 close so that the amplified program signal appearing on contact 3 is transmitted by the line 326 to the top track record head 302. At the same time the closure of the contacts 4 and 5 connects the third contact to the biasing potential 308 through the biasing resistor 328 with the result that a D.C. bias is applied to the top track record head 302 to cause the amplified program input signal to be recorded at a desired reference level of magnetization on the top track of the tape. Also included between the source 308 and the contact 4 is a resistor 329. The value of the resistors 326 and 329 is for example such as to maintain the bias potential at the contact 3 at a value of approximately 2 volts. Closing of the contacts 4 and 5 also connects the source 308 through the line 330 to the top track erase head 304 to cause the latter to erase the top track of the tape just prior to the recording of the same track by the record head 302. In this case the resistor 329 serves to limit the current flowing through the erase head.

In the line 324 is an equalization capacitor 332 which serves to roll off some of the bass or lower frequencies in the output from the power amplifier 30. The preamplifier 32 mixes the microphone and/or playback signals appearing on the line 320 with the master program signal appearing on the line 318, the line 318 being connected to a high level input of the preamplifier 32 and the line 320 being connected to a low level input. The mixed output is transmitted to the power amplifier 28 and the output from this latter amplifier transmitted by the output line 48 to the student's earphones and to the teacher's console. The output of the power amplifier 28 is also transmitted by the line 334 to the third contact of the relay J. Thus, when the relay J is operated the closing of contacts 2 and 3 causes the output from the power amplifier 28 to be transmitted by the line 324 to the bottom track record head 300. At the same time the closing of contacts 4 and 5 connects the associated source 308 to the bottom track record head 300 through the biasing resistor 336 so that the proper D.C. bias is applied to the bottom track record head to cause recordation of the output signals from the amplifier 28 at a desirable magnetization level on the bottom track of the tape. The closing of the contacts 4 and 5 also connects the source to the bottom track erase head 306 to energize the latter. Between the contact 4 and the source 308 is a resistor 338 which limits the current flowing through the erase head 306. In the line 334 is another equalization capacitor 340 which rolls off some of the bass appearing in the output from the power amplifier 28 to cause a flatter frequency response characteristic when the tape is played back through the earphones.

From the foregoing, it will be observed that when both relays K and J are operated and a master program input appears on the line 46, the program input will be recorded on the top track of the tape exclusive of any other signal while the bottom track of the tape will have recorded thereon both the program input and the microphone input. Thus the top track of the tape contains a recording of the selected master program and the bottom track of the tape may be separately erased without destroying this program. Accordingly, after the master program is recorded on the top track and the student's responses on the bottom, the student may replay the tape with both relays de-energized. This will cause both tracks to be played back through the student's earphones so that he may passively listen to both the master program and his responses for the purpose of making a comparison. If he is unsatisfied with his responses he may rewind all or some of the tape and then play back the same with the relay K de-energized and the relay J energized. This will cause the master program recorded on the top track to be played back to the student and will permit new responses to be recorded on the bottom track, the previous material recorded on the bottom track being erased as the new responses are recorded. Once this has been done, the student may then again repeat the same process of comparison followed by new responses until he is able to duplicate exactly or to his satisfaction the voice of the master program.

OPERATION

The operation of the teaching machine described above in detail may be best understood by considering the functioning of the machine in response to the dialing of various digits on the dial at the student booth.

As a starting condition, assume that all of the components of the machine are in their restored conditions and that no program is recorded on the tape of the student recorder. A student enters booth number 1 at the start of the study period and places the earphones 74 on his head. He then from a printed schedule or other source determines the program number of the master program he desires. For the present purposes, assume that the program number of this program is 12. He then first dials the select program or call digit 6.

The operation of the dial 58 operates the transponder M to cause the production of a train of six dial pulses on the logic dial input line 60. At the start of this pulse train the slow release relay G is operated closing the contacts 3 and 4 thereof and sending a long pulse to the relay A through the closed contacts 1 and 2 of the relay C and the closed contacts 2 and 3 of the relay A to operate the latter. At the same time the pulse train appearing on the line 60 passes to the stepping coil of the relay R through the closed contacts 3 and 4 of the relay B to cause the stepping switch R to be stepped to its sixth step position. At the end of the pulse train the relay G is released. This removes the long pulse from the line 112 and causes operation of the relay B by removal of the ground shunt previously applied through the closed contacts 5 and 6 during the presence of the long pulse.

Movement of the wiper of the second bank of the stepping switch R to the number 6 terminal thereof operates the pulse transfer relay C. At the same time it applies a ground signal to the recorder function control line $38_e$ to cause operation of the relay K in the associated student recorder thereby conditioning the same for recording on the top tape track. Movement of the wiper of the third bank of the stepping switch R to the number 6 terminal causes a ground signal to be applied through the line $38_f$ to the relay J of the student recorder to condition the same for recording on the bottom tape track. Movement of the wiper of the first bank of the stepping switch R to the number 6 position applies ground to the line $38_d$ which in turn causes energization of the solenoid 276 and of the electromagnetic clutch 260 so that the tape 262 is fed through the tape transport mechanism at the normal record speed.

Operation of the relay C applies a ground signal to the line-finder start line $40_c$ by the closing of the contacts 4 and 5 thereof. This start signal is transmitted by the line $40_c$ to the off-normal contacts 4 and 5 of the associated hold magnet of the program selector crossbar switch 216 and through these contacts to the interrupter contact 3 of the line-finder stepping switch coil to cause the latter to start in its stepping operation. At the same time the operation of the relay C closes the contacts 5 and 6 thereof and applies a ground signal to the line-finder stop line $40_b$. This stop signal is applied to the associated or first terminal of the first bank of the line-finder stepping switch X. As the line-finder stepping switch is stepped to this first position the wiper 164 of the first bank thereof engages the grounded terminal and by means of the circuitry connected therewith stops the stepping movement of the switch and causes it to latch in the first position. The ground signal applied to the wiper 164 is also applied by the line 166 to the coil of the relay L to cause the latter to be operated. Closing of the contacts 1 and 2 of the relay L causes the dial tone signal produced by the generator 171 to be transmitted to the wiper 170 of the fourth bank of the line-finder stepping switch X and from there to the line 160 which leads through the off-normal contacts 1 and 2 of the associated crossbar hold magnet to the amplifiers in the associated recorder so that the dial tone is reproduced in the student's earphones.

Operation of the relay C also opens a circuit through the contacts 1 and 2 thereof to prevent the next long pulse generated by the relay G from operating the pulse programming relays A and B.

In summary, immediately after the dialing of the program select digit 6, the relays A, B, C and L are operated and the line-finder stepping switch X is stepped to and latched in the position corresponding to the calling logic unit. Also, the tape deck is set into operation for recording on both the bottom and top tape tracks, and a dial tone is sent to the earphones of the calling student booth.

After dialing the digit 6 and receiving a dial tone, the student next dials the first digit of the program number assigned to the desired master program. Therefore, in this case where the desired program number is 12, he next dials the digit 1.

The single pulse dial train produced by the dial of the digit 1 operates the relay G at the start of the pulse, but the long pulse produced by the closing of the contacts 3 and 4 of this relay do not effect the relays A or B due to the open contacts 1 and 2 of the relay C. The dial pulse is however transmitted by the line $40_a$ to the number 1 terminal of the second bank of the line-finder stepping switch X, and since the line-finder has previously been stepped to the number 1 position by the dial of the digit 6, the dial pulse passes through the wiper 202 and the closed contacts 5 and 6 of the relay E to the program selector stepping switch Y to cause the latter to be stepped to the number 1 position. At the start of the dial pulse, the pulse also operates the slow release relay F which relay again returns to the released position at the end of the pulse and after the switch Y has been stepped to its number 1 position. This closing of the relay F together with the stepped condition of the switch Y applies ground to the coil of the relay E through the closed contacts 1 and 2 of the relay F and the wiper 212 of the second bank of the switch Y to operate the relay E. When the relay E does operate, a circuit is completed through the contacts 3 and 4 thereof and through the first bank of the relay Y to operate the number 1 select magnet 218 in the crossbar switch 216.

Therefore, at the end of the dial of the first digit of the desired program number the relays A, B, C, L and E are operated, the switches X and Y are stepped to off-normal positions, a dial tone is supplied to the student's earphones, and one of the crossbar select magnets is energized.

The student then dials the second digit of the number assigned to the desired program. Still assuming that this program number is 12, he therefore now dials the number 2. This manipulation of the dial causes the transponder to produce a train of two pulses appearing on the line 60 and on the line $40_a$. The train of pulses appearing on the line 60 operates the relay G, but the long pulse produced by the closing of the contacts 3 and 4 thereof again does not effect the pulse programming relays A or B due to the open circuit provided by the contacts 1 and 2 of the relay C. The train of pulses appearing on the line $40_a$, however, passes through the second bank of the line-finder stepping switch X to the number 6 contact of the relay E. The relay E, however, is now operated so that the contacts 6 and 7 thereof are closed. The pulse train therefore passes through these closed contacts to the wiper 206 of the third bank of the switch X. From here the pulse train is conducted to the associated logic unit and through the closed contacts 1 and 2 of the relay H to the coil of the associated program selector stepping switch $Z_1$ to cause the latter to be stepped to its number 2 position.

At the end of this pulse train the release of the relay G and the fact that the program selector switch $Z_1$ is off-normal causes the relay H to be operated by a negative potential applied to the coil of the relay H through the coil of the relay $Z_1$ and the closed off-normal contacts 3 and 4 thereof. When the relay H does operate at the end of the pulse train the closing of its contacts 5 and 6 energizes the crossbar hold magnet 220 associated with the calling, or in this case the number 1, logic unit. This due to the fact that the number 1 select magnet is now energized, causes the first or upper group of ten master program outputs to be connected respectively to the ten active terminals of the switch $Z_1$. Accordingly, since the wiper 230 of the stepping switch $Z_1$ is engaged with the number 2 terminal, the number 12 program is therefore connected with the wiper 230 and the line 232.

Operation of the hold magnet number 1 also by opening the off-normal contacts 1 and 2 associated therewith removes the dial tone from the audio output line 46 and by closing the off-normal contacts 1 and 2 connects the master program output appearing on the line 232 to the audio output line 46. The latter line transmits the selected program to the amplifiers 30 and 32 in the student recorder with the result that the program is recorded on the tape and at the same time transmitted to the student's earphones. Operation of the hold magnet also opens its off-normal contacts 4 and 5 and thereby removes the line-finder start signal from the line-finder stepping switch X. It further opens the off-normal contacts 6 and 7 to remove the stop signal from the line-finder. As a result the line-finder is thereafter freed for use with other calling logics. Removal of the stop signal by the opening of the contacts 6 and 7 also removes ground from the coil of the relay L so that the latter relay is released. Release of the relay L in turn closes the contacts 5 and 6 thereof to shunt out the coil of the relay E. Release of the relay E in turn applies ground through the now closed contacts 5 and 6 of the relay L and the contacts 1 and 2 of the relay E to the number 3 off-normal contact of the stepping switch Y, causing the latter to be restored to its home position for use with subsequent calling logics.

In regard to the restoration of the stepping switch X and the stepping switch Y, it is important that the stepping switch Y be fully restored before the stepping switch X is rendered capable of latching on another calling logic. For example, if the line-finder did latch on another calling logic before the stepping switch Y was fully restored, the operation of the relay L in response to the grounding of the line-finder stop wiper 164 would open the contacts 5 and 6 of the relay L to remove the restore signal from the stepping switch Y. As a result, the wipers of the stepping switch Y would be positioned in an off-normal position at the start of the next program selection process and would therefore be stepped to a false or undesired position in response to the train of stepping pulses transmitted thereto. To prevent such an occurrence, the release of the relay L upon the removal of the line-finder stop signal applies a negative potential, through its contacts 3 and 4 and the off-normal contacts 5 and 6 of the stepping switch Y and the shunt line 184, to the interrupter contact 1 of the switch X. This negative potential on the interrupter contact 1 in turn prevents the switch X from latching even if the wiper 164 engages a ground terminal, and remains on the interrupter contact 1 until the stepping switch Y is fully restored, at which time the off-normal contacts 5 and 6 of the switch Y open. It will be observed that this negative potential will not be applied to the interrupter contact 1 of the stepping switch X until the relay L is fully released and the contacts 3 and 4 thereof closed. It is therefore possible that the switch X could be stepped to another position during the time required for the latter contacts to close. This possibility is prevented by the resistors 186 and 188 and the condenser 162, the values of which are such that the stepping switch X cannot latch without the condenser in the circuit. Therefore, during the time required for the contacts of the relay L to close the contacts 7 and 8 thereof are open and the condenser 162 out of the circuit so that latching of the switch X cannot occur. Once the relay L is closed, however, the negative potential applied to the interrupter contact 1 continues to prevent latching of the stepping switch X until the stepping switch Y is restored.

Assuming that at this time no start signal is applied to the line $40_d$ by another calling logic unit, the line-finder stepping switch X will restore to its home position due to the ground potential applied through the off-normal contacts 4 and 5. If there is a start signal on the $40_d$ the switch X will continue to step until the switch Y is fully restored and will then latch on the logic corresponding to the first grounded terminal engaged by the stop signal wiper 164.

Therefore, after dialing of the second digit of the desired program number the relays A, B, C and H are actuated, the relays C, L, E and F are released, the stepping switches X and Y are restored (or in use with some other calling logic) and the stepping switches R and $Z_1$ are stepped to off-normal positions. The associated crossbar hold magnet is energized and the selected program is transmitted to the student recorder where it is recorded on the tape together with the responses made by the student into his microphone, the selected program and the student's responses also being transmitted to the student's earphones. The student continues to listen and to respond to the selected program for as long as desired, after which time he manipulates the dial in his booth to either change the mode of operation of his tape recorder or to make another program selection. For the purpose of explanation it will be assumed that after listening and responding to the selected program he now desires to play back and listen to what has been recorded on the tape of his recorder.

To do this, the student now dials any digit. This will disconnect his equipment from the selected program and fully restore all components thereof to their initial conditions. The operation of the dial creates a pulse train on the line 60 which operates the relay G to create a long pulse. This long pulse passes through the now closed contacts 3 and 4 of the relay H and the closed contacts 6 and 7 of the relay B to shunt out the relay A.

Release of the relay A restores the stepping switch R by applying a ground signal to the off-normal contact 3 through the contacts 4 and 5 of the relay A. As the wiper 92 of the second bank of the stepping switch R is removed from the sixth terminal thereof ground potential is removed from the coil of the relay C so that the latter relay is accordingly released. Closing of the contacts 3 and 4 of the relay C grounds the off-normal contact 3 of the program selector stepping switch $Z_1$ so that the latter is restored to its home position.

At the end of the dial train the opening of the contacts 1 and 2 on the relay G releases the relay H, but the capacitor 148 across the terminals of this relay delays its release to assure prior full restoration of the stepping switch R.

The release of the relay H in turn releases the associated crossbar hold magnet by the opening of its contacts 5 and 6 and by this act the selected master program output is disconnected from the logic unit. Release of the relay G at the end of the dial train also terminates the long pulse and this in turn removes the ground potential originally applied to the relay B by the line 110 and accordingly releases the latter relay. Thus, at the end of this dial train the logic unit is disconnected from the line-finder and from the program selector, all of the logic unit relays A, B, C, G and H are released and the stepping switch R is restored to its home position.

It should also be noted here, that as the stepping switch R restores, the wipers thereof are moved in the same direction as they are originally stepped. Therefore, in restoring from the sixth terminal the grounded wiper 90 of the first bank sweeps past and momentarily engages the ninth terminal of the associated bank. This terminal in turn is connected by the line $38_b$ to the recorder control relay D as shown in FIG. 5 and the ground pulse applied to the ninth terminal will cause the relay D to be operated and latched in its operated condition by the closing of the contacts 3 and 4 thereof. This operation of the relay D causes, as explained above, the tape recorder to be operated in the rewind mode and the recorder will accordingly rewind until a rewind stop signal is applied to the line $38_a$. Such a stop signal is applied to the line $38_a$ when the wiper 90 reaches the home position and after the relay B is released to close the contacts 1 and 2 thereof. The relay B, however, is not released until the termination of the long pulse produced by the relay G, and the duration of such long pulse may be lengthened by the student holding the dial in its off-normal position for some time prior to releasing it to produce the train of dial pulses. That is, as soon as the dial 58 is moved off-normal the contacts 1 and 2 thereof are closed to operate the transponder M which in turn operates the relay G to close the contacts 3 and 4 thereof and produce a long pulse. This long pulse will immediately restore the relay R and in restoring the wiper 90 will move past the rewind or ninth terminal to apply a pulse to the tape recording mechanism to cause the recorder to begin operating in its rewind mode. As long as the student maintains the dial in an off-normal position the long pulse will be maintained and the recorder will continue to operate in the rewind mode. When the student thereafter releases the dial, the contacts 1 and 2 will be opened and closed to produce the train of dial pulses and at the end of the train of dial pulses the relay G will be released terminating the long pulse and releasing the relay B to apply a rewind stop signal to the recording mechanism through the line $38_a$. Accordingly, whenever the student manipulates the dial to restore the recorder to a stopped condition some rewinding of the tape will take place, and the amount of tape rewound may be controlled by the length of time the dial is held in the off-normal condition. It may also be controlled to some extent by proper selection of the digit dialed to restore the recorder, the higher the digit dialed the longer will be the long pulse produced thereby and the greater will be the amount of tape rewound. This feature is of advantage when the student wishes to replay or re-record a phrase or sentence to which he has just listened.

After dialing a restore digit the student then next dials the digit corresponding to the function which he desires the tape recorder to perform. In this case, where he wants to compare the recorded master program with his responses, and assuming that the program recorded has been fairly long, he will first have to rewind the tape and accordingly dials the rewind number 9. Upon dialing 9 the pulses produced by the dial step the stepping switch R to the number 9 position. The relay G is also operated to produce a long pulse which operates the relay A. Engagement of the wiper 90 of the stepping switch R with the ninth terminal of the first bank applies a ground signal to the line $38_b$ and causes the recorder to rewind. As this rewinding takes place the student will hear the usual rewinding chatter in his earphones and when this chatter stops it is a signal that the tape has been fully rewound. When the tape is fully rewound, the rewinding procedure is automatically stopped by the operation of the micro-switch 270 which shunts out the relay D and thus de-energizes the electromagnetic clutch 258 connected between the motor 254 and the payout reel 250.

The long pulse created by the closing of the relay G at the beginning of the dial pulse train terminates at the end of the train due to the release of the relay G and in response to this termination the relay B is operated. Thus, at the end of the train both the relays A and B are energized. The student then dials a restore digit which may be any number. The dialing of this digit again operates the relay G to create a long pulse, but the dial pulses produced by the operation of the dial are prevented from operating the stepping switch R because of the opened condition of the contacts 3 and 4 of the relay B. Instead, the long pulse produced by the operation of the relay G immediately shunts out and releases the relay A and by the closing of the contacts 4 and 5 of the latter relay applies a ground or restore signal to the stepping switch R to cause the latter to be returned to its home position thereby stopping the recorder. At the end of the train of pulses the relay G releases and terminates the long pulse so that the relay B is de-energized and released. Thus, at the end of the restore pulse all of the relays A, B, C, G and H are again in their unoperated conditions and the stepping switch R is restored to its home position.

Having now rewound the tape the student now dials the two track playback digit, which in this case is the number 2. The dialing of this digit, as previously explained, produces a train of two pulses on the dial line 60 which pulses pass through the closed contacts 3 and 4 of the relay B to step the stepping switch R to its second position. When in this position, the wiper 90 of the first bank of the stepping switch R applies ground to the line $38_d$ to energize both the solenoid 276 and the clutch 260 in the student recorder. This moves the pinch roller 272 into tape feeding relationship with the capstan 256 and applies a driving torque to the takeup reel 252. Accordingly, the tape is moved through the tape recorder and past the two recording heads at the normal recording speed, and since neither of the relays K and J are energized the recording heads will retrieve the information recorded on the two tracks of the tape and cause the same to be played back through the student's earphones.

After the student has listened to as much of the above material as desired, he may stop the recorder by again dialing another restore digit. If he wants to rehear a certain small portion of the tape he may stop the recorder by dialing a restore digit and hold the dial in the off-normal position for a small length of time. This will cause the tape to be rewound for the period that he holds the dial in the off-normal position so that when he again dials the two track playback number 2 he will rehear that portion of the tape which he heard immediately before stopping the machine.

After dialing the restore digit he may, instead of again dialing the two track playback digit, dial the digit 1 which will cause the recorder to operate in such a mode as to play back the top tape track and to record on the bottom tape track. Thus, the student will hear the master program previously recorded on the top track and may make new responses which new responses will be recorded on the bottom tape track. Thus, when he again plays back both tracks he will hear the master program once again together with his new responses. It will be noted that when the digit 1 is dialed the wiper 90 of the first bank of the stepping switch R will be positioned on the number 1 terminal which causes the tape transport mechanism to move the tape through the recording machine at the normal playback speed, and that the wiper 94 of the third bank of the stepping switch will likewise be positioned on the number 1 terminal of the latter bank to cause the relay J to be energized to condition the recorder for recording on the bottom track.

The student also after dialing a restore digit may dial the digit 8 which will move the wiper 90 of the first bank of the stepping switch R to the number 8 terminal and apply a ground signal to the line $38_c$. This in turn causes the tape to be moved through the machine at a fast forward speed in order that the student may rapidly advance the tape to a desired portion of the program located some distance forward on the tape. For example, after the tape is automatically rewound to its full extent the student may move the tape in the fast forward direction in order to pick up a portion of the program recorded some distance from the beginning of the tape rather than listen to that portion of the program recorded on the first part of the tape.

Dialing the number 9 after dialing any restore digit will move the wiper 90 of the first bank of the stepping switch R to the ninth terminal to cause the tape recorder to rewind as above described. Dialing the number 0 will move the wiper 90 to the tenth terminal and thereby send a signal through the console call line 42 to the teacher's console 34 to light a light or actuate some other signal whereby the teacher will be made aware of the student's call. The teacher may then actuate a switch or the like in the console to connect the earphones and microphone at the teacher's console to the student's booth to allow the teacher to converse with the student.

After making full use of the master program recorded on the top track of his tape the student may again dial for and receive any other desired master program by first dialing the select program signal 6 followed by the assigned number of the desired program.

I claim:

1. In a teaching machine for supplying a plurality of students at individual study areas with audible instructional material and including a sound reproducer at each of said study areas, the combination comprising means remote from said study areas having a plurality of master program output lines on which respectively appear a corresponding plurality of master program signals and which master program output lines are divided into a number of groups, a dial means associated with each study area and including a manually operable dial at said study area for producing trains of dial pulses in response to manipulation of said dial by a student, a line-finder, line means connecting each of said dial means to said line-finder, first selecting means responsive to the receipt of a train of dial pulses for selecting one of said groups of program output lines, second selecting means responsive to the receipt of a train of dial pulses for selecting one of the program output lines from the group selected by said first selecting means, means operable in response to a signal produced by a calling dial means to start said line finder in operation and to cause the same to lock on the calling dial means so that trains of dial pulses from said calling dial means may pass therethrough, means for routing the first train of dial pulses passing through said line-finder to said first selecting means to cause the selection of a group of program output lines and for routing the next train of dial pulses to said second selector means to cause the selection of one program output line from said selected group, and a plurality of circuits each exclusively associated with a respective one of said study areas and by-passing said line-finder for connecting the one program output line selected by operation of one of said dial means to the sound reproducer associated with said one dial means.

2. In a teaching machine for supplying a plurality of students at individual study areas with audible instructional material and including a sound reproducer at each of said study areas, the combination comprising means remote from said study areas providing a plurality of master program output lines on which respectively appear a corresponding plurality of master program signals and which master program output lines are divided into a number of groups, a dial means associated with each study area and including a manually operable dial at said study area for producing trains of dial pulses in response to manipulation of said dial by a student, a line-finder, line means connecting each of said dial means to said line-finder, a plurality of first selector mechanisms each exclusively associated with a respective one of said study areas and each including a plurality of input terminals and an output terminal and also including means responsive to the receipt of a train of dial pulses for selectively connecting one of said input terminals to said output terminal, another selector mechanism associated with said line-finder and responsive to the receipt of a train of dial pulses for selecting one of said groups of master program output lines and for connecting the lines comprising said selected group in one-to-one relationship to the input terminals of the first selector mechanism associated with the calling dial means, said another selector mechanism including means enabling any one of said groups of master program output lines to be simultaneously connected to any number of said first selector mechanisms, means operable in response to a signal produced by a calling dial means to start said line-finder in operation and to cause the same to lock on the calling dial means so that dial pulses from said calling dial means may pass therethrough, means for routing the first train of dial pulses passing through said line-finder to the selector mechanism associated with said line-finder to cause the selection of one of said groups of master program output lines and the connection of the same to the input terminals of the first selector mechanism associated with the calling dial means and for routing the next train of dial pulses to the first selector mechanism associated with the calling dial means to selectively connect one input terminal thereof to the output terminal thereof, and a plurality of circuits each exclusively associated with a respective one of said study areas and by-passing said line-finder for connecting the output terminal of the first selector mechanism associated with said one study area to the sound reproducer of said one study area.

3. The combination defined by claim 2 further characterized by said another selector mechanism including means for holding the selected group of master program output lines in connected relation to the input terminals of the first selector mechanism associated with the calling dial means after such selection is made, and means operable after the operation of said holding means for restoring the remainder of said another selector mechanism to a condition of readiness for use with a subsequent calling dial means.

4. In a teaching machine for supplying a plurality of students at individual study areas with audible instructional material, and including a sound reproducer at each of said study areas, the combination comprising means remote from said study areas providing a plurality of master program output lines on which respectively appear a corresponding plurality of master program signals, a dial means associated with each study area and including a manually operable dial at the study area for producing trains of dial pulses in response to manipulation of the dial by a student at said area, a line-finder, line means connecting each of said dial means to said line-finder, a crossbar switch having a plurality of select magnets and a plurality of hold magnets each of which hold magnets is exclusively assigned to a respective one of said dial means, a plurality of program selector stepping switches each assigned to a respective one of said crossbar hold magnets and each having a bank of step terminals and a wiper, a plurality of output lines each connecting a respective one of the wipers of said program selector stepping switches to the associated sound reproducer, said master program output lines being arranged in groups with each group being assigned to a corresponding one of said select magnets, said crossbar switch including contacts connected with said master program output lines and other contacts connected with the step terminals of said selector stepping switches, and means for closing some of said contacts upon the energization of one of said select magnets and the subsequent energization of one of said hold magnets to connect the group of master program output lines assigned to said one select magnet in one-to-one relationship to the step terminals of the program selector stepping switch assigned to said one hold magnet, a level select stepping switch connected between said line-finder and said select magnets and having a bank of step terminals and a wiper and each of which step terminals is connected to a respective one of said select magnets, means operable in response to a signal produced by a calling dial means to start said line-finder in operation and to cause the same to lock on the calling dial means so that subsequent dial pulses from said calling dial means may pass therethrough, means for routing the first train of dial pulses passing through said line-finder to said level select stepping switch to step the same and for routing the following train of dial pulses to the program selector stepping switch assigned to the calling dial means to step the same, means operable at the end of the first of said latter trains of dial pulses for closing a circuit through the wiper and the selected step terminal of said level select stepping switch to energize the corresponding select magnet, means operable at the end of said following train of dial pulses for energizing the hold magnet assigned to the calling dial means with the result that one of said master program output lines is connected to the output line of said latter program selector stepping switch through a pair of closed contacts in said crossbar switch and through the wiper and the selected step terminal of said program selector stepping switch, and means for thereafter releasing said line-finder and said level select stepping switch for use with subsequent calling dial means.

5. In a teaching machine for supplying a plurality of students at individual study areas with audible instructional material and including a sound reproducer at each of said study areas, the combination comprising means remote from said study areas providing a plurality of program output lines on which respectively appear a corresponding plurality of master program signals, a dial means at each study area for producing dial pulses in response to manipulation thereof by the student at said area, a plurality of logic means each associated with a respective one of said dial means and connected with the associated dial means so as to receive the dial pulses produced thereby, a line-finder, a dial pulse transmission line extending from each of said logic means to said line-finder and on which line dial pulses produced by the associated dial means appear, a program selector connected between said line-finder and said program output lines of said remote means, said line-finder including means for connecting the pulse transmission line of a calling logic means to said program selector so that dial pulses from said calling logic means are transmitted to said program selector and said program selector including means responsive to the receipt of said dial pulses to connect the sound reproducer associated with said calling dial means to a selected one of said program output lines, a separate mechanism associated with each study area for recording the master program signal appearing on the selected program output line and for thereafter playing back the same through the associated sound reproducer, means associated with each recording and playback mechanism for controlling the function of the same in response to the receipt of dial pulses, and means in said logic means and responsive to received dial pulses for causing said dial pulses to selectively activate said line-finder or the associated function control means so that each student by manipulating his dial means may selectively control both the selection of programs and the function of his recording and playback mechanism.

6. In a teaching machine for supplying a student at a student area with audible instructional material and including a sound reproducer at said study area, the combination comprising means remote from said study area providing a plurality of master program output lines on which respectively appear a corresponding plurality of master program signals, a recording and playback mechanism, a dial means at said study area for producing trains of dial pulses in response to manipulation thereof by the student at said study area, a program selector responsive to received dial pulses for selectively connecting any one of said master program output lines to said recording and playback mechanism and to said sound reproducer, a means including a stepping switch for controlling the function of said recording and playback mechanism in response to received dial pulses, a pulse programmer for causing alternate trains of pulses from said dial means to respectively step and restore said stepping switch, and restore defeat means operable when said stepping switch is stepped to a predetermined step position to defeat said pulse programmer to prevent the restoration of said stepping switch upon the receipt of the next train of pulses from said dial means and to cause said next train of pulses to be transmitted to said program selector.

7. The combination defined in claim 6 further characterized by means for restoring said stepping switch in response to the next train of dial pulses produced by said dial means after a program selection is completed by said program selector.

8. In a teaching machine for supplying a plurality of students at individual study areas with audible instructional material and including a sound reproducer at each of said study areas, the combination comprising means remote from said study areas providing a plurality of master program output lines on which respectively appear a corresponding plurality of master program signals, a recording and playback mechanism associated with each study area, a dial means at each study area for producing trains of dial pulses in response to manipulation thereof by the student at said area, a line-finder, line means connecting each of said dial means to said line-finder, means associated with each of said study areas and including a stepping switch for controlling the function of the associated recording and playback mechanism in response to received dial pulses, a pulse programmer associated with each of said dial means for causing alternate trains of pulses from said latter dial means to respectively step and restore the associated stepping switch, means associated with each of said dial means and operable when the associated stepping switch is stepped to a predetermined step position to defeat the associated pulse programmer to prevent the restoration of said stepping switch upon the receipt of the next train of pulses from said dial means and to cause said next train of pulses to be transmitted to said line-finder, said latter means further including means for sending a call signal to said line-finder for initiating operation of said line-finder and for causing the same to lock on the line means associated with the calling dial means when said stepping switch reaches said predetermined step position, and a program selector connected to said line-finder and responsive to dial pulses passing through said line-finder from the calling line means on which the line-finder is locked for selectively connecting any one of said master program output lines to said recording and playback mechanism and to the sound reproducer associated with said calling dial means.

9. The combination defined in claim 8 further characterized by means associated with each study area and operable after one of said master program output lines has been connected to said recording and playback mechanism and to said sound reproducer for disconnecting said master program output line from said recording and playback mechanism and from said sound reproducer and for restoring operation of said pulse programmer so that said stepping switch is restored in response to the next train of dial pulses produced by the associated dial means.

10. In a teaching machine for supplying a student at a study area with audible instructional material and including a sound reproducer at said study area, the combination comprising means providing a plurality of master program output lines each of which is assigned a different program number, a recording and playback mechanism operable to record a master program output and to thereafter play back the same through said sound reproducer, a dial operable by said student, said recording and playback mechanism having a plurality of modes of operation each of which operation modes is assigned a different dial digit and one of the dial digits being a select program digit, means operable upon the dial of a mode digit for causing said recording and playback mechanism to operate in the mode corresponding to the dialed digit, means operable upon the dial of any digit following the dial of a mode digit for restoring said recording and playback mechanism to an off condition, means operable upon the dial of said select program digit followed by the dial of a program number for connecting the program output corresponding to the dialed program number to said converting means and to said recording and playback mechanism, and means for causing said recording and playback mechanism to backtrack whenever said dial is moved off-normal following the dial of a mode digit and until said dial is returned to its normal position.

11. In a teaching machine for supplying a student at a study area with audible instructional material, the combination comprising a dial at said study area operable by said student, a recording and playback mechanism exclusively associated with said study area and having a plurality of modes of operation each of which operation modes is assigned a different dial digit, means operable upon the dial of a mode digit for causing said recording and playback mechanism to operate in the mode corresponding to the dialed digit, means operable upon the dial of any digit following the dial of a mode digit for restoring said recording and playback mechanism to an off condition, and means for causing said recording and playback mechanism to backtrack whenever said dial is moved off-normal following the dial of a mode digit and until said dial is returned to its normal position.

12. In a teaching machine for supplying a plurality of students at a number of different study areas with audible instructional material and including a program source having a plurality of program output lines divided into a number of groups and on which respectively appear a corresponding plurality of master program signals, and a sound reproducer at each of said study areas, the combination comprising a plurality of dials each located at a respective one of said study areas, a cross-bar switch having a number of hold columns each exclusively associated with a respective one of said study areas and a plurality of select levels each associated with a respective one of said groups of program output lines, each of said hold columns having a plurality of output terminals, means operable in response to the dialing of a first number on one of said dials to cause said cross-bar switch to selectively connect one of said groups of program output lines to the output terminals of the hold column associated with said one dial, and means operable in response to the dialing of a second number on said dial for selectively connecting one of the program output lines from the selected group to the sound reproducer associated with said dial, said latter means including a plurality of selector mechanisms each exclusively associated with a respective one of said study areas and each having a plurality of input terminals connected respectively with the output terminals of the corresponding hold column of said cross-bar switch.

13. The combination as defined in claim 12 further characterized by a line-finder connected between said dials and said cross-bar switch, said line-finder including means for assigning said cross-bar switch to one of said dials in response to a call signal from said latter dial, and means for releasing said cross-bar switch for assignment to another calling dial after the completion of a program selection by said one dial.

14. In a teaching machine for supplying a plurality of students at individual study areas with audible instructional material and including a sound reproducer at each of said study areas, the combination comprising means remote from said study areas providing a plurality of master program output lines on which respectively appear a corresponding plurality of master program signals, a dial means associated with each study area and including a manually operable dial at the study area, a single line-finder exclusively serving said study area, a line means connecting each of said dial means to said line-finder, each of said dial means including means operable by a student at the associated study area to produce a call signal and dial pulses which call signal and dial pulses are transmitted by said line means to said line-finder, and a program selector connected between said line-finder and said master program outputs of said remote means, said line-finder being operative upon the receipt of a call signal from any one of said dial means to connect such calling dial means to said program selector so that subsequent dial pulses from said calling dial means are transmitted to said program selector, said program selector including means operative upon the receipt of said dial pulses to select a desired one of said master program output lines in accordance with the character of said dial pulses, means connecting the sound reproducer associated with said calling dial means to the selected program output line in by-passing relationship to said line-finder so that the student at the associated study area will hear the selected master program, and means responsive to the completion of said selection of a desired one of said master program output lines for disconnecting said line-finder from said calling dial means so as to thereafter be available for use with subsequent calling dial means.

15. In a teaching machine for supplying a plurality of students at individual study areas with audible instructional material and including a sound reproducer at each of said study areas, the combination comprising means remote from said study areas providing a plurality of master program output lines on which respectively appear a corresponding plurality of master program signals, a dial means associated with each study area and including a manually operable dial at the study area, a line-finder, line means connecting each of said dial means to said line-finder, each of said dial means including means operable by a student at the associated study area to produce a call signal and dial pulses which call signal and dial pulses are transmitted by said line means to said line-finder, a program selector connected between said line-finder and said master program outputs of said remote means, means providing a plurality of master program transmission circuits each extending from said program selector to a respective one of said sound reproducers and by-passing said line-finder, said line-finder including means responsive to the receipt of a call signal from any one of said dial means to connect such calling dial means to said program selector so that subsequent dial pulses from said calling dial means are transmitted to said program selector, said program selector including means operative upon the receipt of said dial pulses to select one of said master program outputs in accordance with the character of said dial pulses and to connect the same to the transmission circuit associated with the sound reproducer associated with said calling dial means so that the student at the associated study area will hear the selected master program, said program selector including program holding means for holding the connection made between any one of said transmission circuits and a selected master program output line, and means for freeing said line-finder for use with a subsequent calling dial means after a program selection has been made and completed by operation of one of said program holding means.

16. In a teaching machine for supplying a plurality of students at individual study areas with audible instructional material and including a remote source of master program output signals and a plurality of recording and playback mechanisms each associated with a respective one of said study areas, the combination comprising a plurality of dial means each associated with a respective one of said study areas for generating trains of short dial pulses, a program selector operable in response to dial pulses received from one of said dial means to selectively connect one of said master program output signals to the recording and playback mechanism associated with said one dial means, and a plurality of logic devices each associated with a respective one of said dial means, each of said logic devices comprising means including a stepping switch for controlling the function of the associated recording and playback mechanism which stepping switch includes a stepping coil and a bank of terminals and a wiper having a home position and adapted to engage said terminals successively, said stepping switch also including means responsive to a restore signal for returning said wiper to its home position, circuitry connecting said stepping coil to the associated dial means which circuitry includes a pulse programmer responsive to a first train of pulses received from said dial means for operating said stepping coil once for each pulse in said train and responsive to the next train of pulses received from said dial means for generating and transmitting a restore signal to said stepping switch to restore said wiper to its home position, circuitry connected with one of the terminals of said stepping switch and including a pulse transfer relay operable when said wiper is positioned on said latter terminal to prevent operation of said pulse programmer in response to following trains of pulses received from said dial means, and circuitry connected with said program selector and including a relay means operable at the completion of a selection by said program selector to override said pulse transfer relay and permit the next train of pulses to again operate said pulse programmer.

17. A teaching machine for supplying a student at a study area with audible instructional material, said teaching machine comprising means providing a plurality of master program output signals, a sound reproducer at said study area, a recording and playback mechanism having an input terminal and an output terminal, said output terminal being connected with said sound reproducer and said mechanism including a control means which is selectively operable to cause said mechanism to record the signal appearing at said input terminal or to cause said mechanism playback a previously recorded signal to said output terminal, a dial at said study area, and means associated with said dial and responsive to the dialing of various numbers thereon for selectively connecting any desired one of said master program output signals to said sound reproducer and to said input terminal of said recording and playback mechanism and for controlling the function of said recording and playback mechanism, said latter means including means responsive to the dial of a particular digit for commanding said control means to operate said recording and playback mechanism in the record mode and for causing a master program selection to be made in accordance with the immediately following dialed number.

18. In a teaching machine for supplying a plurality of students at individual study areas with audible instructional material and including a sound reproducer at each of said study areas, the combination comprising means remote from said study areas having a plurality of master program output lines on which respectively appear a corresponding plurality of master program signals, dial means associated with each study area for producing trains of dial pulses in response to manipulation of said dial by a student, a program selecting means having a plurality of output terminals each exclusively associated with a respective one of said study areas, said program selecting means including input terminals connected to said master program output lines and further including means responsive to the receipt of dial pulses to selectively connect one of said master program output lines to the output terminal thereof associated with the study area from which the dial pulses originated, means including a line-finder servicing all of said study areas for transmitting dial pulses from a calling one of said dials to said program selecting means, and a plurality of circuits each connected to a respective one of said output terminals of said program selecting means and by-passing said linefinder for connecting said one output terminal to the sound reproducer of the study area associated with said one output terminal.

References Cited by the Examiner

UNITED STATES PATENTS

| | | | |
|---|---|---|---|
| 1,524,311 | 1/25 | Quayle | 179—18 |
| 2,328,562 | 9/43 | Lesavoy | 179—6 |
| 2,699,466 | 1/55 | Kobler | 179—6 |
| 2,810,017 | 10/57 | Tyszkiewicz | 179—6 |
| 2,876,561 | 3/59 | Horne | 35—35.3 |
| 2,921,385 | 1/60 | Hamilton | 35—9 |
| 2,966,551 | 12/60 | Lomax | 179—18.3 X |
| 2,972,020 | 2/61 | Nogami et al. | 179—27.54 |
| 3,069,789 | 12/62 | Knight et al. | 35—35.3 |

OTHER REFERENCES

"The Language Laboratory," L. J. Anderson, RCA Engineer, Feb.–Mar. 1960, p. 32–34.

Brochure "Why Califone?", Rheem Califone Corporation, Hollywood 38, Calif. (published July 1959).

Synchrotone VM–62 tape recorder, Magnetic Recording Industries, Audio, Visual Equipment Directory, 1955, p. 127.

EUGENE R. CAPOZIO, *Primary Examiner.*

LEO SMILOW, GEORGE A. NINAS, JR., JEROME SCHNALL, *Examiners.*